US007446792B2

(12) United States Patent
Yamada et al.

(10) Patent No.: US 7,446,792 B2
(45) Date of Patent: Nov. 4, 2008

(54) METHOD AND APPARATUS FOR FORMING VISIBLE IMAGE ON OPTICAL DISK

(75) Inventors: Seiya Yamada, Hamamatsu (JP);
Hisanori Itoga, Hamamatsu (JP);
Tatsuo Fushiki, Hamamatsu (JP);
Kazuya Mushikabe, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 98 days.

(21) Appl. No.: 11/477,781

(22) Filed: Jun. 30, 2006

(65) Prior Publication Data
US 2007/0019064 A1    Jan. 25, 2007

(30) Foreign Application Priority Data

| Jun. 30, 2005 | (JP) | ............................. 2005-191233 |
| Jun. 30, 2005 | (JP) | ............................. 2005-191235 |
| Jun. 30, 2005 | (JP) | ............................. 2005-191236 |
| Jun. 30, 2005 | (JP) | ............................. 2005-191237 |
| Jun. 29, 2006 | (JP) | ............................. 2006-179639 |
| Jun. 29, 2006 | (JP) | ............................. 2006-179640 |
| Jun. 29, 2006 | (JP) | ............................. 2006-179641 |
| Jun. 29, 2006 | (JP) | ............................. 2006-179642 |

(51) Int. Cl.
*B41J 2/435* (2006.01)

(52) U.S. Cl. .................................................. 347/224

(58) Field of Classification Search ......... 347/224–225; 369/44.32, 47.53; 400/70; 720/718
See application file for complete search history.

(56) References Cited

U.S. PATENT DOCUMENTS

| 5,898,655 | A | * | 4/1999 | Takahashi | ................ 369/47.53 |
| 5,967,676 | A | * | 10/1999 | Cutler et al. | ................... 400/70 |
| 2004/0004912 | A1 | * | 1/2004 | Morishima | ............... 369/44.32 |
| 2006/0026622 | A1 | * | 2/2006 | Valley et al. | ................. 720/718 |

FOREIGN PATENT DOCUMENTS

| JP | 2002-203321 A | 7/2002 |
| JP | 2003-16649 A | 1/2003 |
| JP | 2004-39019 A | 2/2004 |
| JP | 2004-63030 A | 2/2004 |

* cited by examiner

*Primary Examiner*—Hai C Pham
(74) *Attorney, Agent, or Firm*—Crowell & Moring LLP

(57) ABSTRACT

An optical disk has inner and outer information areas respectively in inner and outer portions thereof in each of which a groove is formed at a predetermined width. A planar mirror surface is provided without forming a groove, in an area lying between the areas. When a laser beam is applied to the area to form a visible image, visible-image information, capable of representing the position, shape and size of an area occupied by the visible image, is formed and recorded in the area. When additionally forming a visible image, the image area information is read from the area to display on an edit screen an optical disk and an area of a visible image already formed on the surface of the disk. The user is allowed to determine a newly-recording visible image and its position by use of the edit screen.

21 Claims, 22 Drawing Sheets

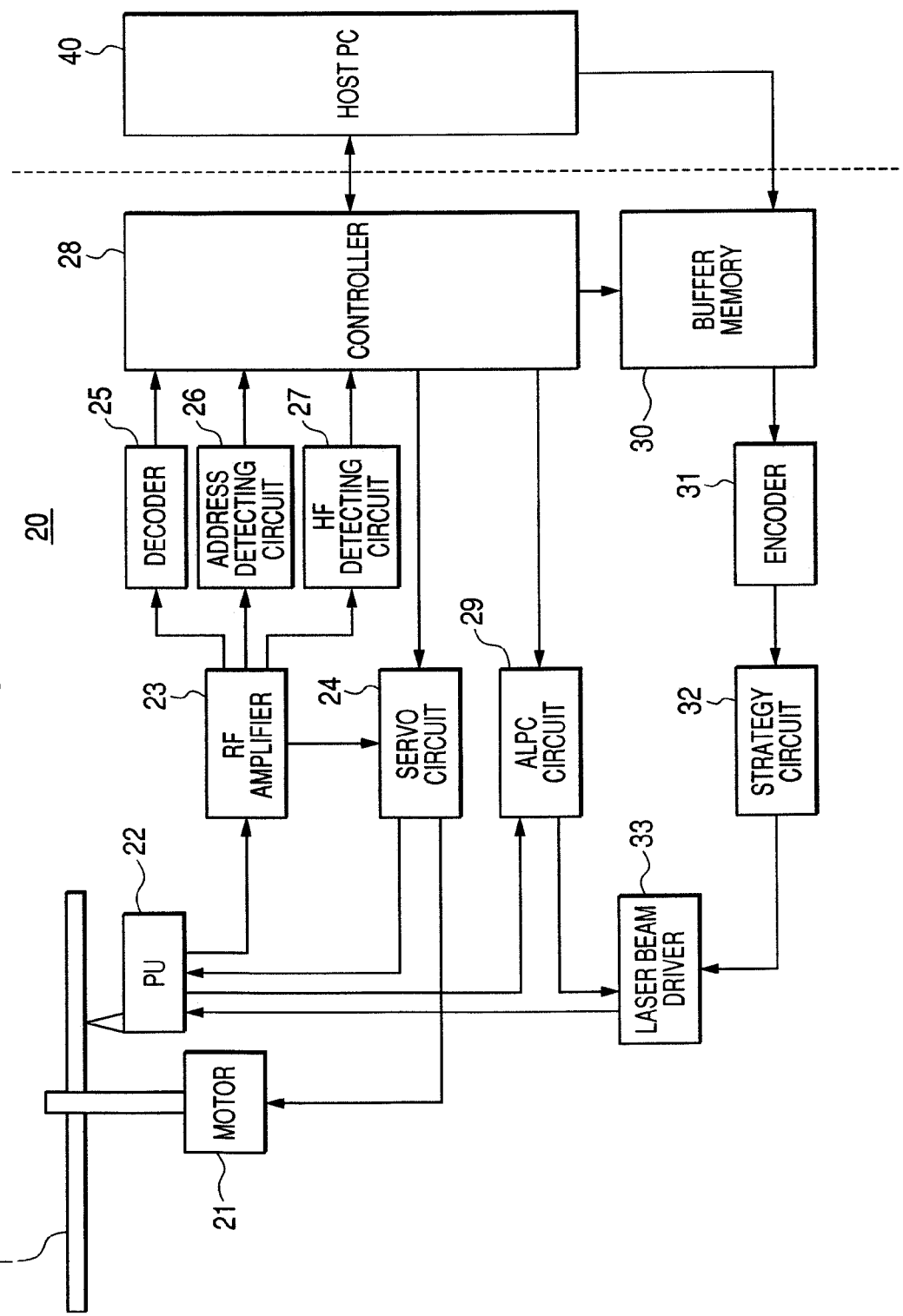

FIG. 9

| DISK | INFORMATION B | INFORMATION C |
|---|---|---|
| (1) | 1 | $B^1_0$ : ABCDEFGH | c:¥data¥abcdefgh.bmp($C^1_0$) |
| (2) | 1 | $B^1_0$ : ABCDEFGH | c:¥data¥abcdefgh.bmp($C^1_1$) |
| (3) | 2 | $B^2_0$ : ACEGIKMO | c:¥data¥acegikmo.bmp($C^2_0$) |
| (4) | 3 | $B^3_0$ : 01234567 | c:¥data¥01234567.bmp($C^3_0$) |

FIG. 11

| | DISK | INFORMATION B | INFORMATION C | INFORMATION D |
|---|---|---|---|---|
| (1) | 1 | $B^1_0$ : AABBCCDD | c:¥data¥picture1.bmp($C^1_0$) | $D^1_0(B^1_0, C^1_0)$ |
| (2) | 1 | $B^1_0$ : AABBCCDD | c:¥data¥picture2.bmp($C^1_1$) | $D^1_1(B^1_0, C^1_1)$ |
| (3) | 2 | $B^2_0$ : ACEGIKMO | c:¥data¥picture1.bmp($C^1_0$) | $D^2_0(B^2_0, C^1_0)$ |
| (4) | 3 | $B^3_0$ : 01234567 | c:¥data¥picture2.bmp($C^1_1$) | $D^3_0(B^3_0, C^1_1)$ |

FIG. 13

| | HOST | DISK | INFORMATION B | INFORMATION C | INFORMATION D |
|---|---|---|---|---|---|
| (1) | α | 1 | $B^1_0$ : AABBCCDD | c:\data\picture0.bmp($C^1_0$) | $D^1_0(B^1_0, C^1_0)$ |
| (2) | α | 1 | $B^1_0$ : AABBCCDD | c:\data\picture1.bmp($C^1_1$) | $D^1_1(B^1_0, C^1_1)$ |
| (3) | α | 1 | $B^1_0$ : AABBCCDD | c:\data\picture2.bmp($C^1_2$) | $D^1_2(B^1_0, C^1_2)$ |
| (4) | α | 2 | $B^2_0$ : ACEGIKMO | c:\data\picture1.bmp($C^1_1$) | $D^2_0(B^2_0, C^1_1)$ |
| (5) | β | 1 | $B^1_0$ : AABBCCDD | c:\tatoo\movie1.bmp($C^1_1$) | $D^1_1(B^1_0, C^1_1)$ |
| (6) | β | 1 | $B^1_0$ : AABBCCDD | c:\tatoo\movie2.bmp($C^1_2$) | $D^1_2(B^1_0, C^1_2)$ |
| (7) | α | 1 | $B^1_0$ : AABBCCDD | c:\data\picture3.bmp($C^1_3$) | $D^1_3(B^1_0, C^1_3)$ |
| (8) | γ | 3 | $B^3_0$ : 01234567 | c:\picture\data0.bmp($C^3_0$) | $D^3_0(B^3_0, C^3_0)$ |

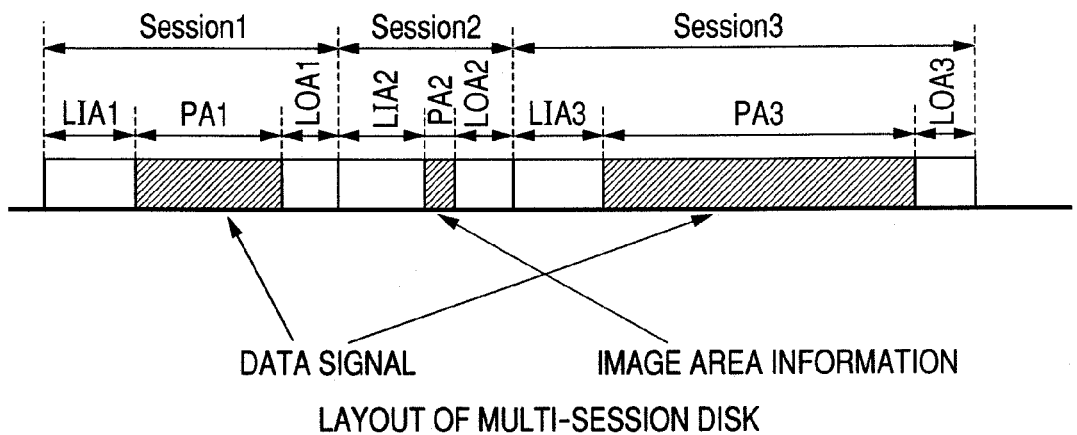

LAYOUT OF MULTI-SESSION DISK

FIG. 20A

| Data byte | Contents |
|---|---|
| 0-3 | RECOGNITION CODE OF IMAGE AREA INFORMATION |
| 4-7 | n: INFORMATION INDICATIVE NUMBER OF ADDITIONAL WRITES |
| 8-11 | INFORMATION INDICATIVE OF SHAPE |
| 12-15 | POLAR COORDINATE INFORMATION 1 |
| 16-19 | POLAR COORDINATE INFORMATION 2 |
|  | . |
|  | . |
| -2047 |  |

DEFINITION OF DATA BYTE OF ONE SECTOR IN MAIN DATA

FIG. 20B

| Data byte | Contents |
|---|---|
| 0-3 | LLS |
| 4-7 | 1 |
| 8-11 | R: Rectangle |
| 12-15 | $A(r1, \theta 1)$ |
| 16-19 | $B(r2, \theta 2)$ |
| 20-23 | $C(r3, \theta 3)$ |
| 24-27 | $D(r4, \theta 4)$ |
| 28-2047 | reserved |

AT THE TIME IMAGE AREA INFORMATION IS (R,A,B),(R,C,D)

| 1 | S0 | | | | | | |
|---|---|---|---|---|---|---|---|
| 2 | S1 | | | | | | |
| 3 | P1 | Q1 | R1 | S1 | T1 | U1 | V1 | W1 |
| 4 | P2 | Q2 | R2 | S2 | T2 | U2 | V2 | W2 |
| 5 | P3 | Q3 | R3 | S3 | T3 | U3 | V3 | W3 |
| . | . | . | . | . | . | . | . | . |
| . | . | . | . | . | . | . | . | . |
| 97 | P95 | Q95 | R95 | S95 | T95 | U95 | V95 | W95 |
| 98 | P96 | Q96 | R96 | S96 | T96 | U96 | V96 | W96 |
| 1 | S0 | | | | | | |
| 2 | S1 | | | | | | |
| 3 | P1 | Q1 | R1 | S1 | T1 | U1 | V1 | W1 |
| 4 | P2 | Q2 | R2 | S2 | T2 | U2 | V2 | W2 |
| 5 | P3 | Q3 | R3 | S3 | T3 | U3 | V3 | W3 |
| . | . | . | . | . | . | . | . | . |
| . | . | . | . | . | . | . | . | . |

STRUCTURE OF SUB-CODE

FRAME STRUCTURE OF SUB-CODE Q CHANNEL

FIG. 22

| Frame | C/A | TNO | POINT | MIN | SEC | FRM | ZERO | PMIN | PSEC | PFRM |
|---|---|---|---|---|---|---|---|---|---|---|
| 1 | 02 | 00 | reserved | 12 | 34 | 56 | 00 | reserved | | reserved |
| 2 | 02 | 00 | reserved | 12 | 34 | 56 | 01 | reserved | | reserved |
| 3 | 02 | 00 | reserved | 12 | 34 | 56 | 02 | reserved | | reserved |
| 4 | 02 | 00 | reserved | 12 | 34 | 56 | 03 | reserved | | reserved |
| 5 | 02 | 00 | reserved | 12 | 34 | 56 | 04 | reserved | | reserved |
| 6 | 02 | 00 | reserved | 12 | 34 | 56 | 05 | reserved | | reserved |
| 7 | 02 | 00 | reserved | 12 | 34 | 56 | 06 | reserved | | reserved |
| 8 | 02 | 00 | reserved | 12 | 34 | 56 | 07 | reserved | | reserved |
| 9 | 02 | 00 | reserved | 12 | 34 | 56 | 08 | reserved | | reserved |
| 10 | 02 | 00 | reserved | 12 | 34 | 56 | 09 | reserved | | reserved |
| 11 | 01 | | | | | | | | | |
| 12 | 01 | | | | | | | | | |
| 13 | 01 | | | | | | | | | |
| 14 | 01 | | | | | | | | | |
| 15 | 01 | | | | | | | | | |

METHOD AND APPARATUS FOR FORMING VISIBLE IMAGE ON OPTICAL DISK

BACKGROUND OF THE INVENTION

The present invention relates to a method and apparatus for forming a visible image on an optical disk by use of a laser beam to the surface of an optical disk, such as a CD-R/RW, a DVD+R/RW or a DVD-R/RW.

It is known to form a visible image, such as a character and a figure, onto the recording surface or the label surface (opposite surface to the recording surface) of an optical disk by use of a laser beam.

For example, Patent Document 1 proposes to provide a visible-light-characteristic change layer in a position to be seen from the label side of the optical disk so that a visible image can be formed by changing the visible-light characteristic by application of a laser beam.

Patent Document 2 proposes to use a reversible phase-change material in a recording layer of the optical disk that can record a visible image by use of a laser beam so that the figure being recorded can be rewritten.

Patent Document 3 proposes to newly, additionally write a visible image onto the recording surface of an optical disk already formed with a visible image.

Patent Document 4 proposes a barcode that can be suitably formed on the optical disk surface.

Patent Document 1 JP-A-2002-203321
Patent Document 2 JP-A-2003-016649
Patent Document 3 JP-A-2004-039019
Patent Document 4 JP-A-2004-063030

As described above, Patent Document 3 proposes to additionally write a visible image further to the surface of the optical disk on which a visible image is already formed by means of a laser beam.

However, in the Patent Document 3, the manner and sequence in additional image formation is fixed previously so that the user is not allowed to make an addition in a free manner.

For adding a visible image, it is necessary to recognize the on-disk-surface position of the visible image already formed, in order to prevent against the overlap of the image newly recorded with the existing image and against the occurrence of a useless space.

For this reason, Patent Document 3 proposes (1) a method to detect a positional address from the wobble formed on the disk, to thereby record a start or end address of the visible image recorded, and (2) a method to form an area a visible image is formed from the envelope form in a reflection light signal.

However, in the method of (1), there is a need to provide a groove in the area where to record a visible image in order to detect the positional address. Meanwhile, in the method (2), despite there is a difficulty in detecting a position accurately, especial accuracy is not needed because the position, sequence and shape is fixed previously.

SUMMARY OF THE INVENTION

Therefore, it is an object of the present invention to provide a method and apparatus for forming a visible image to an optical disk, allowing to additionally form a visible image easily and freely on an optical disk by use of a laser beam.

In order to solve the above object, the present invention is characterized by having the following arrangement.

(1) A method of forming a visible image on an optical disk, the method comprising:

recording, in a predetermined area of an optical disk, image area information representing a position, shape and size of a first visible image formed on the optical disk when the visible first image is formed on the optical disk by a laser beam;

reading the image area information from the optical disk;

displaying, as a first image, a grasped visible image area which corresponds to the position, shape and size represented by the image area information on an edit screen;

editing the first image and second image data corresponding to a second visible image to be newly added and formed on the optical disk on the edit screen; and forming, on the optical disk, a second visible image corresponding to the edited second image data displayed on the edit screen.

(2) The method according to (1), wherein the optical disk includes a visible-image recording area for forming a visible image thereon and a recording area having a plurality of tracks helically formed by grooving, in advance, at least one of innermost and outermost portions of the disk, the groove is not formed in the visible-image recording area, and the image area information is recorded in the recording area.

(3) The method according to (1), wherein the image area information includes information representing a point in the grasped visible image area by a polar coordinate system with a particular radial direction as a reference-angle position and a center of the optical disk as an origin.

(4) The method according to (2), wherein the image area information recording step is to encode the image area information by a predetermined coding method and form a mark and a space alternately in the track of the recording area based on the encoded image area information.

(5) The method according to (2), wherein the image area information recording step is to assign bits of the image area information respectively to sectors into which the track of the recording area is divided by a predetermined length and form the sectors in a state to be optically distinguished according to a bit value of the bits.

(6) The method according to (2), wherein the image area information recording step is to form a barcode corresponding to the image area information radially in the recording area.

(7) The method according to (1), wherein the optical disk has a dual layer structure constituted by an image forming layer and a data recording layer, and in the recording step, the image area information is recorded in the data recording layer.

(8) An apparatus for forming a visible image on an optical disk by using a laser beam, the apparatus comprising:

a recording unit that records, in a predetermined area of an optical disk, image area information representing a position, shape and size of a first visible image formed on the optical disk when the first visible image is formed on the optical disk by a laser beam;

a reading unit that reads the image area information from the optical disk;

a display unit that displays, as a first image, a grasped visible image area which corresponds to the position, shape and size represented by the image area information on an edit screen;

an editing unit that edits the first image and second image data corresponding to a second visible image to be newly added and formed on the optical disk on the edit screen; and an image forming unit that forms, on the optical disk, a second visible image corresponding to the edited second image data displayed on the edit screen.

(9) The apparatus according to (8), wherein
the optical disk includes a visible-image recording area for forming a visible image thereon and a recording area having a plurality of tracks helically formed by grooving, in advance, at least one of innermost and outermost portions of the disk,
the groove is not formed in the visible-image recording area, and
the recording unit records the image area information in the recording area.

(10) The apparatus according to (8), wherein the image area information includes information representing a point in the grasped visible image area by a polar coordinate system with a particular radial direction as a reference-angle position and a center of the optical disk as an origin.

(11) The apparatus according to (9), wherein the image area information recording unit encodes the image area information by a predetermined coding method and forms a mark and a space alternately in the track of the recording area based on the encoded image area information.

(12) The apparatus according to (9), wherein the image area information recording unit assigns bits of the image area information respectively to sectors into which the track of the recording area is divided by a predetermined length, and forms the sectors in a state to be optically distinguished according to a bit value of the bits.

(13) The apparatus according to (9), wherein the image area information recording unit forms a barcode corresponding to the image area information radially in the recording area.

(14) The apparatus according to (8), wherein an optical pickup for applying the laser beam to the optical disk constitutes a part of the recording unit and a part of the image forming unit.

(15) The apparatus according to (8), wherein
the optical disk has a one side dual layer structure constituted by an image forming layer and a data recording layer, and
the recording unit records the image area information in the data recording layer.

(16) A method of forming a visible image in an optical disk, the method comprising:
recording an identification number unique to the optical disk in a predetermined area of the optical disk;
storing, when a first visible image is formed to the optical disk by a laser beam, first image data of the optical disk, on which the first visible image is formed, with the identification number recorded to the optical disk into a host computer;
reading the identification number from the optical disk;
reading a newest one of the first image data associated the read-out identification number from the host apparatus;
displaying the read-out the first image data on an edit screen;
editing the first image data and second image data corresponding to a second visible image to be newly added and formed to the optical disk on the edit screen; and
forming, on the optical disk, a second visible image corresponding to the edited second image data displayed on the edit screen.

(17) The method according to (16), wherein, in the storing step, after storing into the host computer the first image data with the identification number, the first image data stored earlier in the host computer, is erased.

(18) The method according to (16), wherein
the optical disk includes a visible image recording area for forming a visible image thereon and a recording area having a plurality of tracks helically formed by grooving, in advance, at least one of innermost and outermost portions of the disk,
the groove is not formed in the visible-image recording area, and
the identification number is recorded in the recording area.

(19) The method according to (18), wherein the identification number recording step is to encode the identification number by a predetermined coding method and form a mark and a space alternately in the track of the recording area based on the encoded identification number.

(20) The method according to (18), wherein the identification number recording step is to assign bits of the identification number respectively to sectors into which the track of the recording area is divided by a predetermined length and form the sectors in a state to be optically distinguished according to a bit value of the bits.

(21) The method according to (18), wherein the identification number recording step is to form a barcode corresponding to the identification number radially in the recording area.

(22) The method according to (16), wherein the identification number is recorded when a visible image is formed on the optical disk for the first time.

(23) The method according to (16), wherein the identification number is a disk identification number stored in a program memory area of the optical disk.

(24) An apparatus for forming a visible image in an optical disk, the apparatus comprising:
an recording unit that records an identification number unique to the optical disk in a predetermined area of the optical disk;
a storing unit that stores, when a first visible image is formed to the optical disk by a laser beam, first image data of the optical disk, on which the first visible image is formed, with the identification number recorded to the optical disk into a host computer;
a reading unit that reads the identification number from the optical disk;
a display unit that reads a newest one of the first image data associated the read-out identification number from the host apparatus and displays the read-out first image data on an edit screen;
an editing unit that edits the first image data and second image data corresponding to a second visible image to be newly added and formed to the optical disk on the edit screen; and
an image forming unit that forms, on the optical disk, an second visible image corresponding to the edited second image data displayed on the edit screen.

(25) The apparatus according to (24), wherein, after the storing unit stores into the host computer the first image data of the optical disk formed with the visible image with the identification number, the first image data stored earlier in the host computer, is erased.

(26) The apparatus according to (24), wherein
the optical disk includes a visible image recording area for forming a visible image thereon and a recording area having a plurality of tracks helically formed by grooving, in advance, at least one of innermost and outermost portions of the disk,
the groove is not formed in the visible-image recording area, and
the recording unit records the identification number in the recording area.

(27) The apparatus according to (26), wherein the identification number recording unit encodes the identification number by a predetermined coding method and forms a mark and a space alternately in the track of the recording area based on the encoded identification number.

(28) The apparatus according to (26), wherein the identification number recording unit assigns bits of the identification respectively to sectors into which the track of the recording area is divided by a predetermined length, and forms the sectors in a state to be optically distinguished according to a bit value of the bits.

(29) The apparatus according to (26), wherein the identification number recording unit forms a barcode corresponding to the identification number radially in the recording area.

(30) The apparatus according to (24), wherein an optical pickup for applying the laser beam to the optical disk constitutes a part of the recording unit and a part of the image forming unit,

(31) The apparatus according to (24), wherein the identification number is recorded when a visible image is formed on the optical disk for the first time.

(32) The apparatus according to (24), wherein the identification number is a disk identification number stored in a program memory area of the optical disk.

(33) A method of forming a visible image on an optical disk, the method comprising:

recording, in a predetermined area of the optical disk, an identification number unique to the optical disk;

storing first image data of the optical disk, on which a first visible image is formed, and link information, which associates the first image data with the identification number of the optical disk, into a host computer when the first image is formed on the optical disk;

first reading the identification number from the optical disk;

second reading a newest one of image data from the host computer based on the read-out identification number and the link information;

displaying the read-out image data on an edit screen;

editing the image data and image data corresponding to a second visible image to be newly added and formed on the optical disk on the edit screen; and forming, on the optical disk, a visible image corresponding to the edited second image data displayed on the edit screen.

(34) The method according to (33), further comprising storing the identification number to the host computer when the identification number is recorded in a predetermined area of the optical disk in the recording step, wherein the second reading step includes a step of making an alert display when the host apparatus does not store an identification number which corresponds to the identification number of the optical disk or when the host apparatus does not store the link information associated with the identification number of the optical disk.

(35) The method according to (33), wherein, in the storing step, after storing the link information associating the image data with the identification number to the host computer, the link information corresponding to the identification number of the optical disk, stored earlier in the host apparatus, is erased.

(36) The method according to (33), wherein the optical disk includes a visible-image recording area for forming a visible image thereon and a recording area having a plurality of tracks helically formed by grooving, in advance, at least one of innermost and outermost portions of the disk, the groove is not formed in the visible-image recording area, and the identification number is recorded in the recording area.

(37) The method according to (36), wherein the identification number recording step is to encode the identification number by a predetermined coding method and form a mark and a space alternately in the track of the recording area based on the encoded identification number.

(38) The method according to (36), wherein the identification number recording step is to assign bits of the identification number respectively to sectors into which the track of the recording area is divided by a predetermined length and form the sectors in a state to be optically distinguished according to a bit value of the bits.

(39) The method according to (36), wherein the identification number recording step is to form a barcode corresponding to the identification number radially in the recording area.

(40) The method according to (33), wherein the identification number is recorded when a visible image is formed on the optical disk for the first time.

(41) The method according to (33), wherein the identification number is a disk identification number stored in a program memory are of the optical disk.

(42) An apparatus for forming a visible image on an optical disk, the apparatus comprising:

a recoding unit that records, in a predetermined area of the optical disk, an identification number unique to the optical disk;

a storing unit that stores first image data of the optical disk on which a visible first image is formed, and link information, which associates the first image data with the identification number of the optical disk, into a host computer when the first image is formed on the optical disk by a laser beam;

a first reading unit that reads the identification number from the optical disk;

a second reading unit second that reads a newest one of image data from the host computer based on the read-out identification number and the link information;

a display unit that displays the read-out image data on an edit screen;

an editing unit that edits the image data and image data corresponding to a second visible image to be newly added and formed on the optical disk on the edit screen; and an image forming unit that forms, on the optical disk, a visible image corresponding to the edited second image data displayed on the edit screen.

(43) The apparatus according to (42), wherein the storing unit stores the identification number to the host computer when the identification number is recorded in a predetermined area of the optical disk by the recording unit, and wherein the second reading unit makes an alert display when the host apparatus does not store an identification number which corresponds to the identification number of the optical disk or when the host computer does not store the link information associated with the identification number of the optical disk.

(44) The apparatus according to (42), wherein, after the storing unit stores the link information associating the image data with the identification number to the host computer, the link information corresponding to the identification number of the optical disk, stored earlier in the host apparatus, is erased.

(45) The apparatus according to (42), wherein the optical disk includes a visible-image recording area for forming a visible image thereon and a recording area having a plurality of tracks helically formed by grooving, in advance, at least one of innermost and outermost portions of the disk, the groove is not formed in the visible-image recording area, and the identification number is recorded in the recording area.

(46) The apparatus according to (45), wherein the recording unit encodes the identification number by a predetermined coding method and forms a mark and a space alternately in the track of the recording area based on the encoded identification number.

(47) The apparatus according to (45), wherein the recording unit assigns bits of the identification respectively to sectors into which the track of the recording area is divided by a predetermined length and form the sectors in a state to be optically distinguished according to a bit value of the bits.

(48) The apparatus according to (45), wherein the recording unit forms a barcode corresponding to the identification number radially in the recording area.

(49) The apparatus according to (42), wherein the identification number is recorded when a visible image is formed on the optical disk for the first time

(50) The apparatus according to (42), wherein an optical pickup for applying the laser beam to the optical disk constitutes a part of the recording unit and a part of the image forming unit.

(51) The apparatus according to (42), wherein the identification number is a disk identification number stored in a program memory area of the optical disk.

(52) A method of forming a visible image on an optical disk, the method comprising:

recording an identification number unique to the optical disk in a predetermined area of the optical disk;

recording, in a predetermined area of the optical disk, first positional information which represents a position, shape and size of an area on a disk surface occupied by a first visible image when the first visible image is formed on the optical disk by a laser beam;

storing, into a host computer, first image data of the optical disk on which the first visible image is formed and link information which associates the first image data with the identification number of the optical disk when the first visible image is formed on the optical disk;

reading the identification number and the first image area information from the optical disk;

reading the first image data based on the read-out identification number and the link information, and displaying the first image data on an edit screen;

editing the first image data and second image data corresponding to a second visible image to be newly added and formed on the optical disk on the edit screen; and forming, on the optical disk, the second visible image corresponding to the edited second image data displayed on the edit screen.

(53) The method according to (52), wherein the display step comprises a step of, when the link information corresponding to the identification number of the optical disk is not stored in the host computer, displaying the optical disk and the area of the optical disk occupied by the first visible image based on the first visible image area information read from the optical disk instead of displaying the first image data.

(54) The method according to (52), wherein the display step comprises:

calculating second image area information representing an position, shape and size of a second visible image contained in the second image data based on the first image data, comparing between the calculated second positional information and the first image area information read from the optical disk, and displaying, when a result of comparison is not in agreement, an image which corresponds to the position, shape and size represented by the first image area information instead of displaying the image data.

(55) The method according to (52), wherein, in the storing step, after storing the link information associating the first image data with the identification number to the host apparatus, the link information corresponding to the identification number of the optical disk, stored earlier in the host computer, is erased.

(56) The method according to (52), wherein the optical disk includes a visible image recording area for forming a visible image thereon and a recording area having a plurality of tracks helically formed by grooving, in advance, at least one of innermost and outermost portions of the disk, the groove is not formed in the visible-image recording area, and the identification number and the image area information are recorded in the recording area.

(57) The method according to (52), wherein the identification number is recorded when a visible image is formed on the optical disk for the first time.

(58) The method according to (52), wherein the optical disk has a one side dual layer structure constituted by an image forming layer and a data recording layer, and the identification number and the image area information is recorded in the data recording layer.

(59) An apparatus for forming a visible image on an optical disk by a laser beam, the apparatus comprising:

a first recording unit that records an identification number unique to the optical disk in a predetermined area of the optical disk;

a second recording unit that records, in a predetermined area of the optical disk, first positional information which represents a position, shape and size of an area on a disk surface occupied by a visible first image when the first visible image is formed on the optical disk by the laser beam;

a storing unit that stores, into a host computer, first image data of the optical disk on which the first visible image is formed and link information which associates the first image data with the identification number of the optical disk when the first visible image is formed on the optical disk;

a reading unit that reads the identification number and the first image area information from the optical disk;

a display unit that reads the first image data stored in the storing unit based on the read-out identification number and the link information, and displaying the first image data on an edit screen;

an editing unit that edits the first image data and second image data corresponding to a second visible image to be newly added and formed on the optical disk on the edit screen; and an image forming unit that forms, on the optical disk, the second visible image corresponding to the edited second image data displayed on the edit screen.

(60) The apparatus according to (59), wherein the display unit displays, when the link information corresponding to the identification number of the optical disk is not stored in the host computer, the optical disk and the area of the optical disk occupied by the first visible image based on the first image area information read from the optical disk instead of displaying the first image data.

(61) The apparatus according to (59), wherein the display unit:

calculates second image area information representing an position, shape and size of a second visible image contained in the second image data based on the first image data, compares between the calculated second positional information and the first image area information read from the optical disk, and displays, when a result of comparison is not in agreement, an image which corresponds to the position, shape and size represented by the first image area information instead of displaying the image data;

(62) The apparatus according to (59), wherein, after the storing unit stores the link information associating the first image data with the identification number to the host computer, the link information corresponding to the identification number of the optical disk, stored earlier in the host computer, is erased.

(63) The apparatus according to (59), wherein
the optical disk includes a visible image recording area for forming a visible image thereon and a recording area having a plurality of tracks helically formed by grooving, in advance, at least one of innermost and outermost portions of the disk,
the groove is not formed in the visible-image recording area, and
the identification number and the image area information are recorded in the recording area,

(64) The apparatus according to (59), wherein the identification number is recorded when a visible image is formed on the optical disk for the first time.

(65) The apparatus according to (59), wherein an optical pickup for applying the laser beam to the optical disk constitutes a part of the first recording unit, a part of the second recoding unit and a part of the image forming unit.

(66) The apparatus according to claim (59), wherein
the optical disk has a one side dual layer structure constituted by an image forming layer and a data recording layer, and
the identification number and the image area information is recorded in the data recording layer.

BRIEF DESCRIPTION OF THE DRAWINGS

FIGS. 2A and 2B are drawings for explaining image area information, in which FIG. 2A shows the case a visible image is grasped as a rectangle while FIG. 2B shows the case grasped as a circle.

FIGS. 4A and 4B are drawings for explaining the case that only the area corresponding to a design in the image data is to be recorded as image area information, in which FIG. 4A shows the case grasped as a sector form while FIG. 4B shows the case grasped as a rectangle.

FIGS. 5A and 5B are drawings for explaining the case to reproduce a design form in the image data with fidelity, wherein FIG. 5A shows the case representing as a polygon while FIG. 5B shows the case representing by a plurality of sector forms.

FIG. 6A to 6C are drawings for explaining a method for recording image area information to the first kind of optical disk, in which FIG. 6A shows the case to record image area information directly to the recording area, FIG. 6B shows the case to segment the track of the recording area by a predetermined length and record the sector on a 1-bit basis, and FIG. 6C shows the case to form a barcode corresponding to the image area information to the recording area by a technique of visible-image recording.

FIG. 7 is a block diagram showing an arrangement in an embodiment of an optical recording apparatus according to the invention.

FIG. 9 shows a drawing for explaining the identification number to be uniquely provided to each optical disk and the image data to be stored in the host apparatus.

FIG. 11 is a drawing for explaining the identification number uniquely provided to each optical disk, image data and link information.

FIG. 13 is a drawing for explaining the identification number uniquely provided to each optical disk and the image data and link information stored in the host apparatus.

FIG. 18A shows a layer structure of a CDR type dual layer optical disk, FIG. 18B shows a layer structure of a DVDR type dual layer optical disk and FIG. 18C shows a layer structure of a CDR-DVDR composite type dual layer optical disk.

FIG. 19 is a drawing for describing a recording state of a program area in the second kind of optical disk.

FIGS. 20A and 20B are diagrams for describing a method of recording image area information in the second kind of optical disk. FIG. 20A is a diagram shown definition of data byte, and FIG. 20B is a diagram showing a concrete example of record of the image area information.

FIG. 21A is a drawing showing a structure of sub-code, and FIG. 21B is a drawing showing a frame structure of sub-code Q channel.

FIG. 22 is a drawing showing a state in which a disk identification number is recorded in the sub-code Q channel.

DETAILED DESCRIPTION OF PREFERRED EMBODIMENTS

First Embodiment

As an optical disk used in the first embodiment of the invention, mainly two kinds of optical disk are employed. At first, explanation is now made on the two kinds of optical disks used in the first embodiment of the invention. Thereafter, image area information recorded in the optical disk, a recording method of the image area information, a structure of an optical-disk recording apparatus and an operation of the optical disk recording apparatus according to the present invention will be described in this order.

1.1.1. First Kind of Optical Disk Used in First Embodiment

Figure 1:
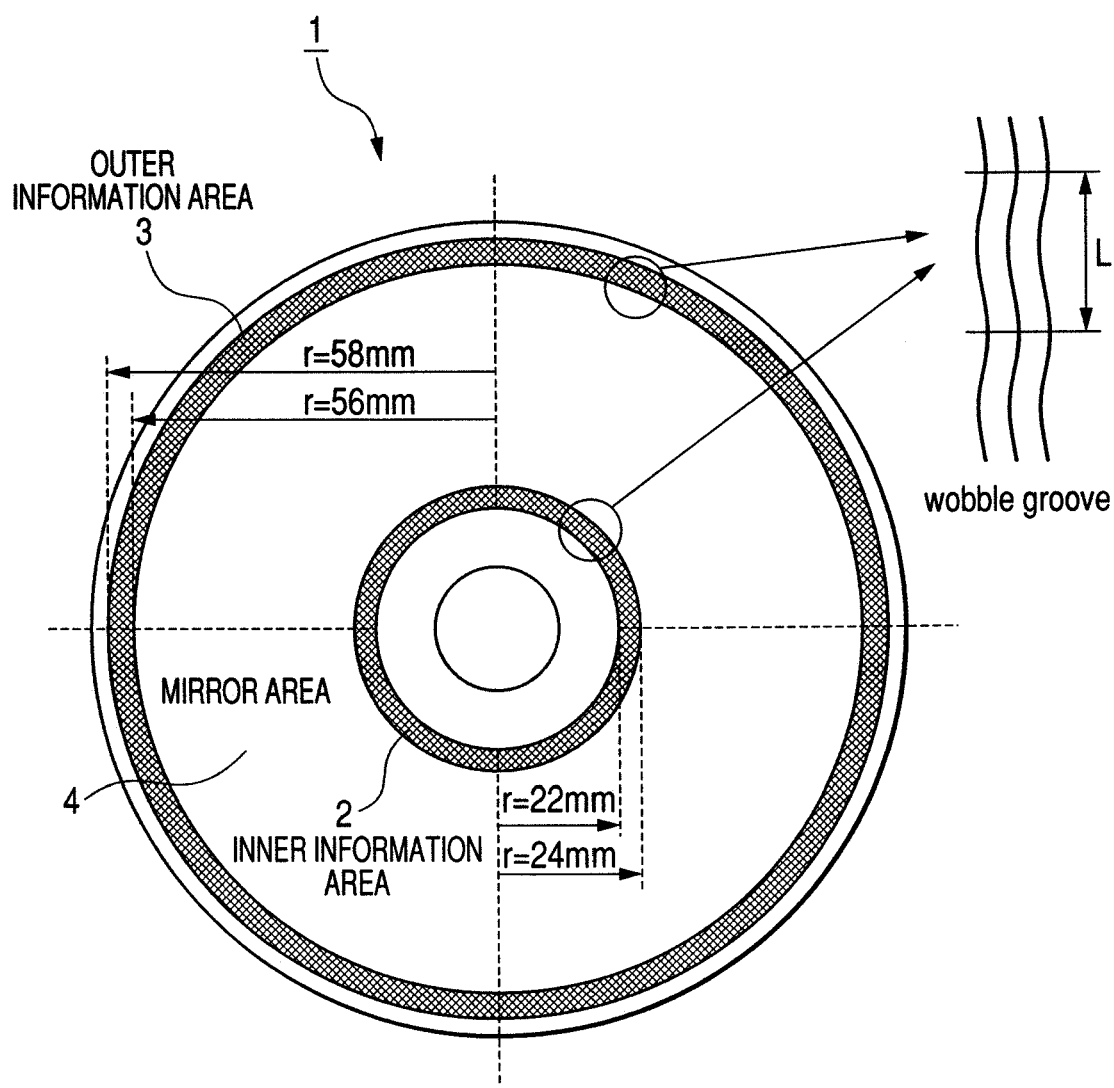
FIG. 1 is a drawing showing a structure of the first kind of optical disk 1 used in the invention.

FIG. 1 shows an arrangement of a label surface of a first kind of an optical disk 1 used in the first embodiment. Incidentally, the recording surface may be of any of the CD (CD-R/RW) and DVD (DVD-R/RW, DVD+R/RW).

In the optical disk 1, a groove is formed helically in an inner peripheral portion extending from a predetermined radius to a predetermined radius, as shown in the figure. Further, a groove is formed helically in an outer peripheral portion extending from a predetermined radius to a predetermined radius. In the illustrated example, an area 2 (hereinafter, referred to as an "inner information area") is formed in an innermost portion ranging in radius of from 22 mm to 24 mm, and an area 3 (hereinafter, referred to as an "outer information area") is formed in an outermost portion ranging in radius of from 56 mm to 58 mm. Image area information is to be stored in the inner information area 2 or the outer side information area 3. Note that there is no need to provide both the inner information area 2 and the outer information area 3, i.e. any one of those may be provided.

The groove is formed with a wobble. The wobble is subjected to phase modulation, FM modulation or the like so that an on-disk-surface position (address information) can be known. The wobble may be formed to the specification of ADIP (Address In Pre-Groove) conforming to the DVD standard, of ATIP (Absolute Time in Pre-Groove) conforming to the CD standard or quite differently from those. The wobble may be in a length (one-period length) formed constant or variable within the area thereof.

Between the inner information area 2 and the outer information area 3, an area 4 is provided as a visible-image recording area on which a visible image can be formed. As described in Patent Document 1, by applying a laser beam to the visible-image recording area 4, the visible-light characteristic is changed to form a visible image.

In the visible-image recording area 4, a planar mirror surface is made without forming a groove. The invention employs a polar coordinate system for the image area information representing a point indicative of an area of a visible image formed on the surface of the disk. This eliminates the need of on-disk-surface absolute-address information differently from Patent Document 3. Therefore, a groove is not necessary to provide and tracking is not required to apply during forming a visible image. In light of the fact that the provision of a groove has an effect upon the visible image appearance due to the interference of light or the like, the planner mirror surface is employed for the visible-image recording area 4.

Meanwhile, on the optical disk 1, a reference angle is defined in one radial direction thereof. A predetermined address point known from a mark such as a black point provided on the optical disk 1 or from the inner or outer information area 2, 3, can be established as a mark indicative of the reference angle.

When the first time a visible image is formed on the optical disk or when a visible image is additionally formed on the optical disk 1, visible-image formation is started in synchronism with the timing of detecting the mark indicative of the reference angle. This makes it possible to start the image formation at the same on-disk-surface angle every time the image is formed. When a new visible image is added to the optical disk on which a visible image is already formed, the additional visible image can be formed on a desired position relative to the existing visible image.

1.1.2. Second Kind of Optical Disk Used in First Embodiment

The first kind of optical disk described above is an optical disk in which data is recorded on a recording surface and an image is formed on a label surface which is opposed to the recording surface. Accordingly, when the image is formed on the label surface after data is recorded on the recording surface, the optical disk has to be turned over be inserted into the optical-disk recording apparatus.

Next, the second kind of optical disk in which turning over and inserting operation of the optical disk is not necessary is described. The second kind of optical disk is a one side dual layer disk (dual layer disk) in which a data recording layer and an image forming layer (visible image recording layer) are formed on a disk, and both layers (data recording layer and the image forming layer) can be accessed from one side by only changing focus position of a lens. As described below, when the second kind of optical disk is used, the image area information can be recorded in the data recording layer.

As the dual layer disk, there are CDR type, DVDR type, mix type of CDR-DCDR and the like.

Figure 18A:
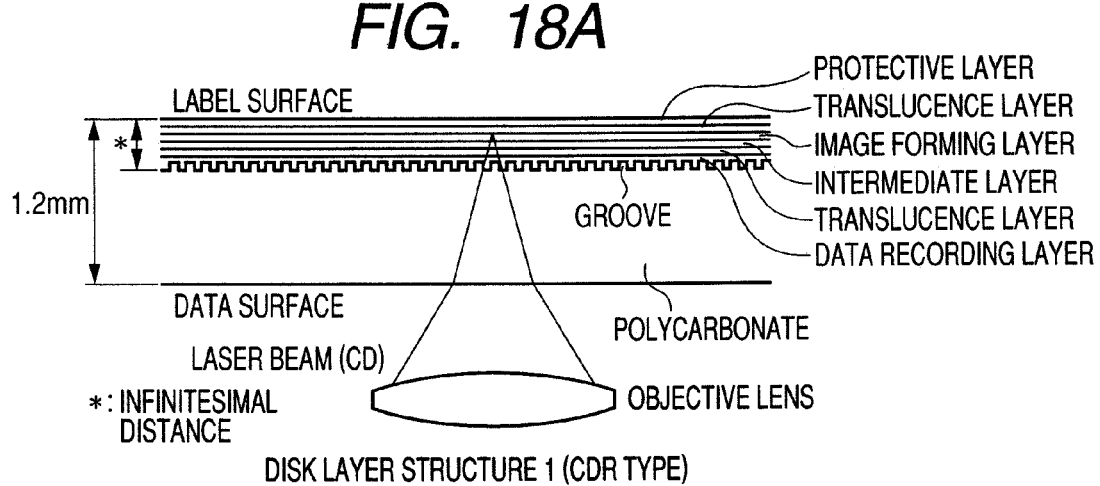
FIGS. 18A to 18C show a layer structure of a second kind of optical disk used in the present invention.
Figure 18B:
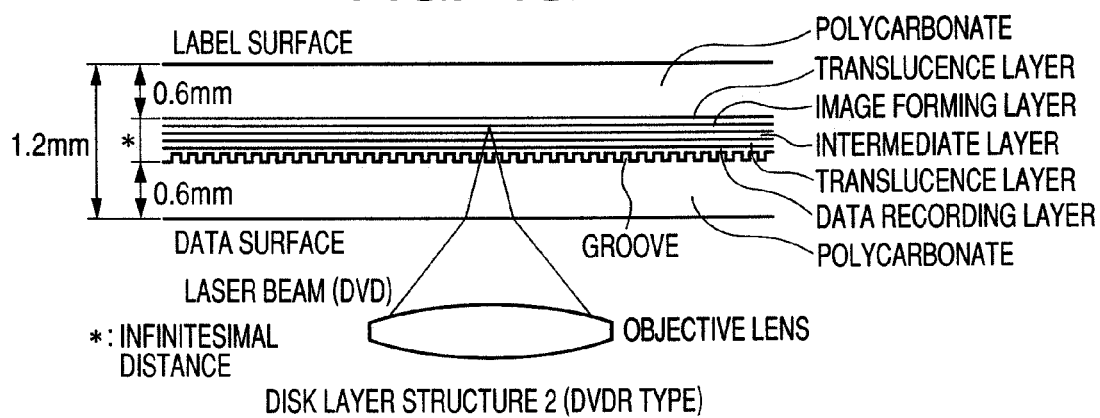
Figure 18C:
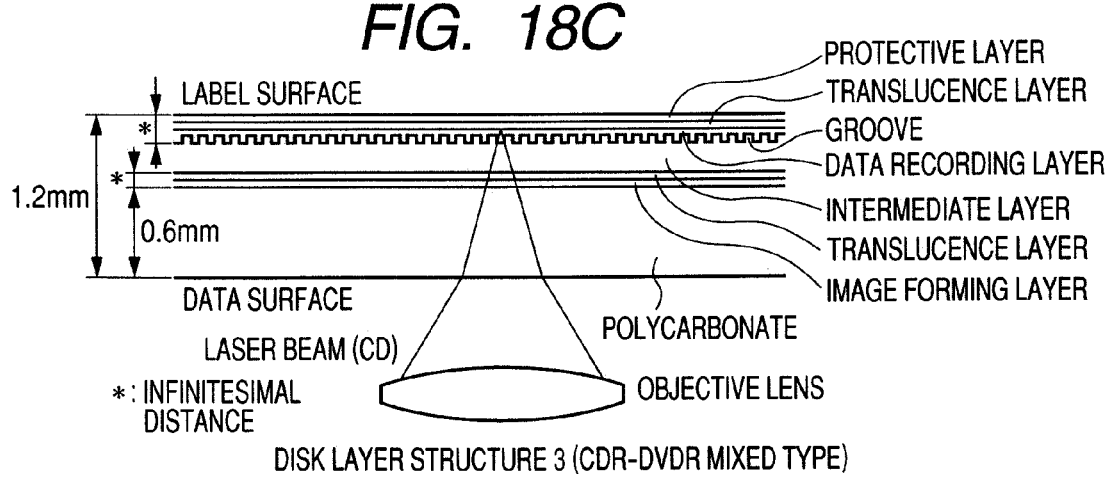

FIGS. 18A to 18C show a layer structure of the second kind of optical disk used in the present invention. FIG. 18A shows a layer structure of a CDR type dual layer disk and FIG. 18C shows a layer structure of a CDR-DVDR composite type dual layer disk.

As shown in FIG. 18A, the CDR type dual layer disk is provided with a polycarbonate layer formed with a groove (guide groove) and a data recording layer in this order from data surface side (objective lens side). While in the typical CDR, a reflective layer and a protective layer are provided next to the data recording layer, in the disk according to the present invention, a translucence layer is provided on the data is provided on the data recording layer and the image forming layer (visible image recording layer) is provided thereon through an intermediate layer. To make the formed image visible from the label side, the translucence layer and the protective layer are formed on the image forming layer. Whole thickness is set 1.2 mm.

Laser beam passed through the objective lens transmits through the data recording layer and the translucence layer and reaches the image forming layer, thereby the image forming layer is heated, a chemical reaction of a thermosensitive layer thereof is caused and a color is changed, so that the image is formed.

FIG. 18B shows the layer structure of the DVDR type dual layer disk.

As shown in the drawing, in order from data surface side, a first polycarbonate layer formed with a groove, a data recording layer and a first translucence layer an intermediate layer, an image forming layer a second translucence layer and a second polycarbonate layer are provided. Whole thickness of the disk is 1.2 mm.

The DVD data recording substrate is composed of the first polycarbonate layer, the data recording layer ad the first translucence layer. The image forming substrate is composed of the image forming layer, the second translucence layer and the second polycarbonate layer.

Laser beam passed through the objective lens transmits the data recording layer and the translucence layer and reach the image forming layer, thereby the image can be formed.

FIG. 18C shows a layer structure of the CDR-DVDR composite type disk. The CDR-DVDR composite type disk can use selectively one of two systems. In one system, a data recording is conducted at a CD side and an image formation is conducted at a DVD side, and in the other system, the data recording is conducted at DVD side and the image formation is conducted at CD side. FIG. 18C shows the former system in which a data recording is conducted at a CD side and an image formation is conducted at a DVD side.

As shown in the drawing, a polycarbonate layer, an image forming layer and a first translucence layer an intermediate layer formed with a groove, a data recording layer, a second translucence layer and a protective layer are formed in order from the data surface side (i.e., objective lens side).

The image forming substrate is composed of the polycarbonate layer, the image forming layer and the first translucence layer. The CD data recording substrate is composed of the intermediate layer, the data recording layer, the second translucence layer and the protective layer.

When using the optical disk having one side dual layer structure, the data recording and reproducing and the image formation can be performed without turning over and setting the disk because the reading and writing on both sides can be performed from one side by only changing the focus position of the laser beam. Further, since the disk is a multi session disk in which additional writing can be performed by track-at-once "TAO" or session-at-once "SAO" method, the image area information can be recorded as main data in a program area of the data recording layer. To use the second kind of optical disk, it is not necessary to newly add a hardware component and this can be done by only changing a firmware of the optical-disk recording apparatus.

Incidentally, in the second kind of optical disk, a predetermined address position of the data recording layer can be used as a mark indicative of the reference angle position.

In the first embodiment, in the case of using the first kind of optical disk, when forming a visible image on the visible-image recording area 4, image area information representing a position, shape and size of the formed visible image recorded is formed in the inner information area 2 or the outer information area 3. In the case of using the second kind of optical disk, when recording the image on the image forming layer, the image area information is to be recorded in the program area of the data recording data of the disk. When a new visible image is additionally formed thereafter on the visible-image recording area 4 or on the image forming layer, the image area information is read out to display the area where image formation is already done. Accordingly, a visible image can be formed in a desired shape in desired arrangement without encountering an overlap with the exiting visible image.

1.2. Image Area Information

Explanation is now made on the image area information capable of representing a position, shape and size of the area occupied by a formed visible image.

In the first embodiment, the position, shape and size of the visible image can be represented by using the information indicative of a position of a point contained in the formed visible image and the information indicative of in what form the visible image is grasped. Such image area information differs depending upon in what form the visible image area is grasped.

The position of the point is represented by use of a polar coordinate system. A polar coordinate system is used in which the origin is taken at the center of the optical disk and the reference line (position at angle zero) is on the radius corresponding to the reference angle. Note that the angle, in the explanation, is assumed to increase clockwise with respect to the reference line.

1.2-1 Case to Grasp the Area of Visible Image as Rectangle or Circle

Figure 2A:
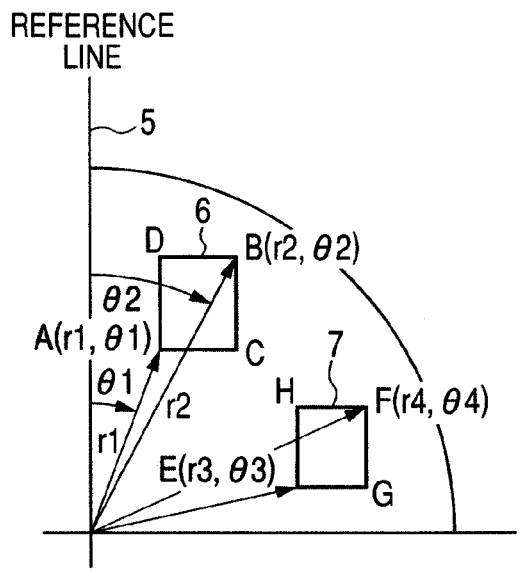
Figure 2B:
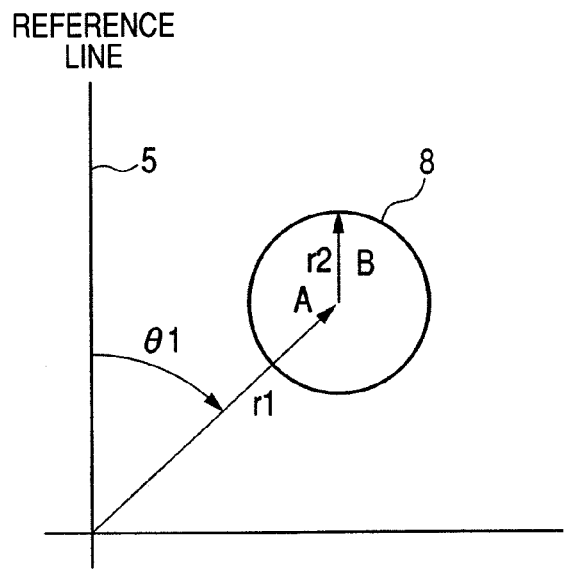

FIG. 2 shows an image area information in the case the visible image is grasped as a rectangle or a circle FIG. 2A shows the case grasped as a rectangle while FIG. 2B the case as a circle.

When forming a visible image in the visible-image recording area 4 or on the image forming layer of the optical disk 1, an image-edit program is used on a host computer to produce or select image data containing a figure or a character to form. By controlling the power of a laser beam based on the image data, a visible image is formed.

In general, the image data, containing a figure and character (hereinafter referred to as a "design") is in a bit-map form (bmp.) or so, whose outer shape is usually square or rectangular. Accordingly, when one side of the square or rectangle 6 is arranged parallel with the reference line 5, the image data has a point A at the innermost in the polar coordinate system which point is taken (r1, θ1) and a point B positioned outermost which point is taken (r2, θ2), as shown in FIG. 2A. In the figure, points C and D can be determined by calculation if the coordinates of the points A and B are known. This makes it possible to determine the size of the visible image.

In addition to the coordinate information, information representative of a fact that the visible image has been grasped as a square or a rectangle is recorded. Namely, the image area information is given in the form of (R, A(r1, θ1), B2(r2, θ2)) where "R" means "rectangle".

Incidentally, the radius information "r2" at a coordinate B at the outermost may exceed the radius of the optical disk. Meanwhile, when handling a rectangle only, it is satisfactory to record only the coordinates of the points A and B.

In a certain arrangement of the visible image, there is a possible case where the points A and D or the points A and C are in the same radial position. In such a case, the smaller one in angle is adopted. In this case, because the points B and C or the points B and D are also in the same radial position, the greater angular one is adopted.

It is assumed that, thereafter, a visible image 7 shown in the figure is additionally formed. At this time, in the case of using the first kind of optical disk, image area information (R, E(r3, θ3), F(r4, θ4)) correspondingly to a new visible-image area 7 is additionally recorded in the inner information area 2 or the outer information area 3. In the case of the using the second kind of optical disk, the image area information indicative of both an area of the visible image having been existed prior to the adding, and an area of the added visible image 7, that is, the image area information corresponding to all the images formed on the disk after adding the image is recorded on the data recording layer of the second kind of optical disk. From then on, this process is repeated each time a visible image is added onto the disk surface.

FIG. 2B shows a case to grasp the visible image area as a circle. In this case, the position, shape and size of the visible image can be represented by three pieces of information, i.e.

the coordinate (the distance and angle to the circle center) of a center point A of a circle 8, the radius B of the circle (circle radius) and information C representative of a circular form. Namely, it is satisfactory to provide (C, A(r1, θ1), B(r2, θ1)). The angle θ1 may be omitted from the information B. Here, "C" is information having a meaning of "circle".

1.2-2 Case to Grasp the Area of Visible Image as Sector Form

Figure 3:
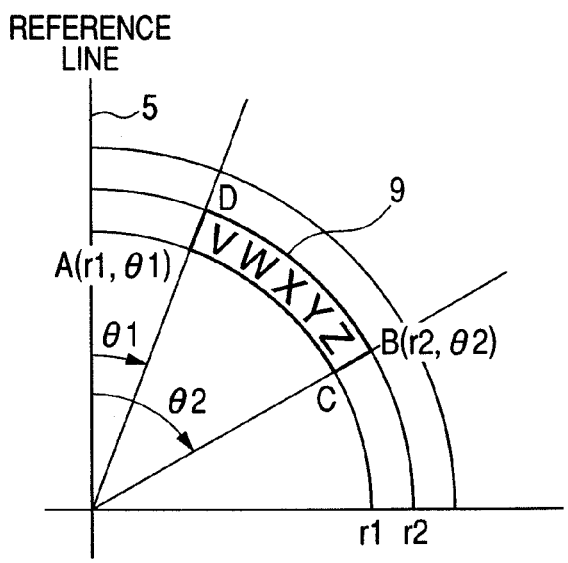
FIG. 3 is a drawing for explaining image area information in the case the visible image is grasped as a sector form.

FIG. 3 shows a case where the visible image is grasped as a sector form. Note that herein the shape is referred to as a sector form, which is surrounded by two arcs equal in center angle but different only in radius and two radial straight-lines connecting between the respective end points of the two arcs.

It is frequent cases that, as shown in FIG. 3, image data, such as a character, is arranged circumferentially in a manner conforming to the disk shape, by application software. In such a case, it is effective to take the visible image area as a sector form rather than a rectangle because useless area of the visible image can be reduced.

For the sector form 9 (area surrounded by arc AC, straight line CB, arc BD and straight line DA) containing a visible image "VWXYZ", it is assumed that the innermost radius is r1, the outermost radius r2, and the forward angle of the sector form as viewed clockwise with respect to the reference line 5 is θ1 and the rear angle thereof is θ2. It is easy to determine the coordinates of the apexes A, B, C, and D of the sector form. Hence, the size of the sector form can be determined.

The information representative of a fact that the image data is grasped as a sector form is recorded in the same manner as the foregoing case. For example, the information is given in the form of (S, A, B). Here, "S" means "sector". Note that, when handling a sector form only, it is satisfactory to record only the coordinates A(r1, θ1) and B(r2, θ2) of points A and B.

1.2-3 Case to Grasp, as Visible Image, Only the Area Corresponding to Design in Visible Image The design, contained in an area of an image data, not always exists over the entire area of the image data. In this case, the method shown in FIG. 2 grasps the visible image area greater despite the design is smaller. Accordingly, the data in a no-design area in the image data is handled as null and excluded from those to be recorded as visible image areas.

Figure 4A:
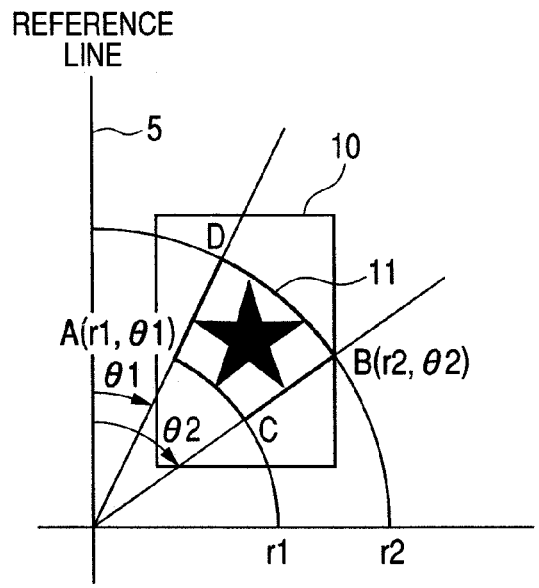
Figure 4B:
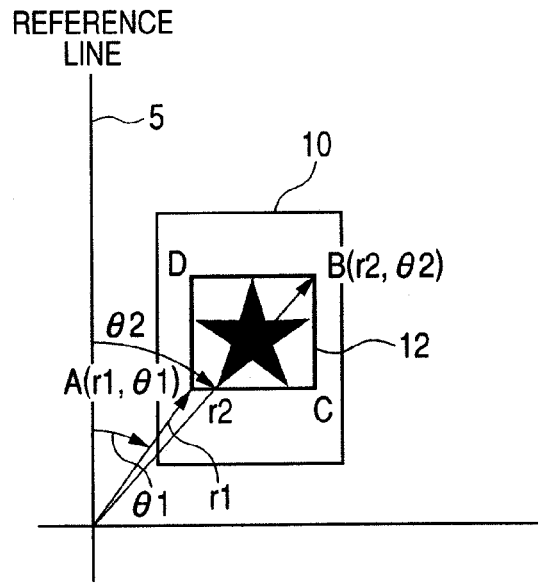

FIGS. 4A and 4B illustrates the manner. It is assumed that a star design is contained in image data 10, as shown in FIGS. 4A and 4B. Then, only the design portion in the image data 10 is extracted as shown in FIG. 4A. This design portion is grasped as a visible image in a sector form 11 in the same manner as the case of FIG. 3, to produce image area information. Otherwise, as shown in FIG. 4B, a design portion in the image data 10 is taken as a visible image in a rectangle 12 similar to the case of FIG. 2A, to produce image area information.

By thus grasping, as visible image area, an design-existing area only in image data, correct image area information can be produced without producing useless area.

1.2-4 Case to Reproduce Shaped of the In-image-data Design Faithfully

The above case grasps the visible image as a rectangle, a circle or a sector form in area. Now, explanation is made on a case to grasp the shape of a visible image as a form approximate to its actual design to a possible extent.

Figure 5A:
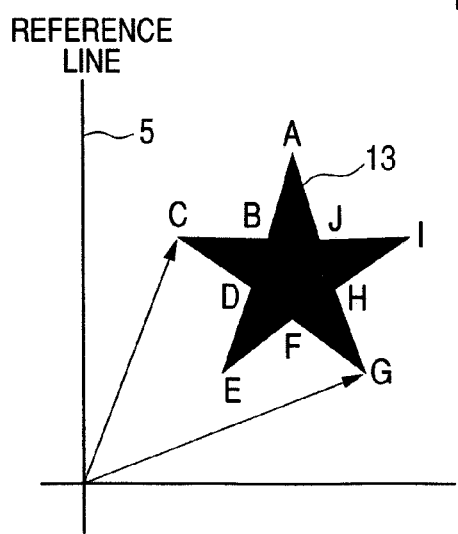

In FIG. 5A, there is shown a case to grasp a design-in-image-data as a polygon.

At first, the data in a no-design area of image data is excluded as null from the subject of image area information, in the same manner as the foregoing case.

Then, a plurality of points are determined at which a position, shape and size can be defined for the design. Although, in the cases of FIGS. 4A and 4B, four apexes of the rectangle or sector form containing the design are defined, a greater number of polar coordinates are required in the present case. Although a plane figure is generally defined in its form by three existing points, there is a need to increase the coordinate points for a complicated figure.

For a star 13 as in FIG. 5A for example, it is satisfactory to take ten coordinate points A-J. It is natural that design shape can be reproduced correctly limitlessly as coordinate points are taken greater in the number. Accordingly, at least three coordinate points are defined in a design periphery, all points of which are contained in the image area information of a visible image. The information representative of a shape is also recorded as the same manner as the cases in the FIGS. 2A, 2B and 3. Namely, the image area information is expressed as A(F, A(r1, θ1), B(r2, θ2), C(r3, θ3), . . . , J(r10, θ10)), for example. Here, "F" is information having a meaning of "free".

In the case of additionally forming a visible image, the area of the visible-image can be reproduced by connecting between those points.

Figure 5B:
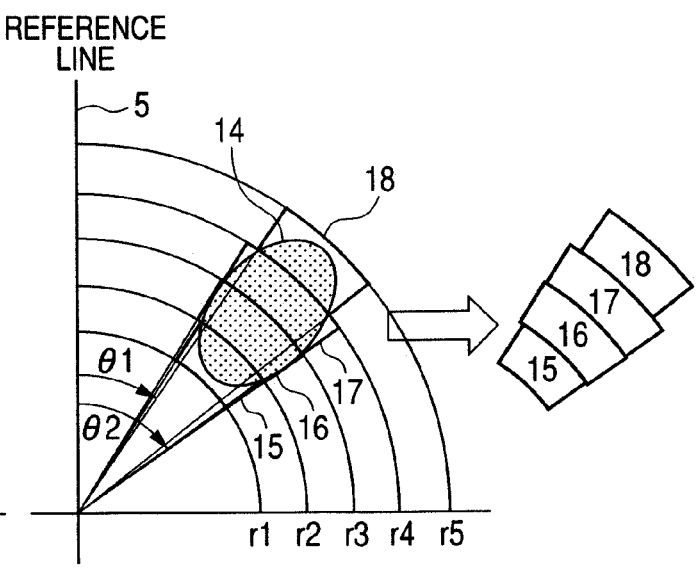

FIG. 5B shows a figure illustrating another method for approximating the visual-image area into a design form to an unlimited extent.

Only the designed area, in image data, is extracted in the same manner as the foregoing case. The area is segmented by a certain radial length (e.g. 5 mm), thus being divided in a circumferential direction. The divisional forms are grasped as sector forms, to represent the design by means of a plurality of sector forms.

In the example shown in FIG. 5B, a design 14 extracted is first segmented by the arcs having respective radii r1, r2, . . . , r5 different at a predetermined-value interval, to determine sector forms 15, 16, 17 and 18 in which each of the areas, surrounded by the adjacent arcs, includes a part of the design 14. The pieces of image area information, similar to FIG. 3 and respectively representing the sector forms 15-18, are taken as image area information representing the design 14.

Incidentally, approximation is toward the actual design as the length of a design-dividing radius is reduced.

1.3.1. Method for Recording Image Area Information in First Kind of Optical Disk Now explanation is made on a method for actually recording the image area information, determined by any of the above-mentioned methods, to the first kind of the optical disk 1 at its predetermined area (inner information area 2 or outer information area 3).

As mentioned before, in the case of the first kind of optical disk, the image area information is recorded in the inner information area 2 provided inner of the disk or the outer information area 2 provided outer of the disk, a groove being formed (image-area-information recording area) at its area in a range.

1.3.1-1 Direct Recording

The inner information area 2 or the outer information area 3 is used as an area corresponding to a PMA (program memory area) under the CD standard.

As shown in FIG. 6A, the image area information is recorded in the inner information area 2 or the outer information area 3 by the use of EFM (eight to fourteen modulation) for use in CD-R/RW or 8-to-16 encoding for use in DVD recording. Namely, recording is made by forming a mark and a space alternately on each track, in accordance with the code of image area information encoded by EFM (eight to fourteen modulation) or 8-to-16 encoding. This can be performed in the same manner as the usual CD or DVD recording.

In reproducing the image area information, it is satisfactory to perform a CD or DVD decoding similar to the usual CD or DVD reproducing.

1.3.1-2 Recording Information in the Sectors into which the Truck is Divided by Predetermined Length, on 1-bit Basis In the foregoing recording method, there is a fear that proper reading is impossible to perform when recording quality (jitter, error) is poor during performing a reproducing after recording. For this reason, by increasing the size of one mark, the effect of recording quality can be ignored.

For this reason, the image area information is recorded by assigning 1 bit of the image area information to each of the sectors into which the track in the inner information area 2 or outer information area 3 is divided by a predetermined length. For example, it is satisfactory to assign one bit to such a predetermined length as a 1 ADIP word, a 1 ECC (error coding code) block or a 1-sub-code frame.

FIG. 6B shows an example that mark length is taken as 1 ADIP word correspondingly to one bit of the image area information. The image area information is recorded by recording a random pattern having a length of 1 ADXP word when the bit is "1" and by not recording such a random pattern when the bit is "0".

The reflectance is higher where a random pattern is not recorded and is lower where a random pattern is recorded. Accordingly, by detecting the level of the light reflected from the optical disk 1, the information recorded can be read out. In this case, image area information can be read out without any problem even if the recording state is somewhat poor. Incidentally, contrary to the above description, in the case that the reflectance is lower where a random pattern is not recorded and is higher where a random pattern is recorded, the recorded information can be read out in the same manner.

Should 2 bytes be used for one polar coordinate, image area information is nearly 5 bytes. In this case, it has a length corresponding to 10 ECC blocks. This length is not problematic at in consideration of the length of the inner information area 2 or outer information area 3.

1.3.1-3 Recording as a Barcode Formed by Utilizing the Visible Image Forming Technique FIG. 6C shows a case to form a barcode corresponding to the image area information. A barcode corresponding to the image area information is formed in the inner information area 2 or outer information area 3 by using a visible-image forming technique. In this case, a barcode is suited which is described in Patent Document 4. Note that, although the bar code has bars arranged in a linear form, those in actual are arranged in a circumferential (radial) form. The information recorded on the barcode can be reproduced by detecting the level of the light reflected from the optical disk 1.

Provided that the radial length of the barcode is 2 mm and the circumferential pitch thereof is nearly 1 mm, reading out is possible to perform even if no tracking is applied.

Note that, in employing the barcode forming method, a groove does not have to be formed in the inner information area 2 or outer information area 3.

1.3.2 Method for Recording Image Area Information in Second Kind of Optical Disk The second kind of optical disk is the multi-session disk in which the data can be added by TAO or SAO method, and the image area information can be recorded as main data in the program area.

FIG. 19 is a diagram for describing a state in which the image area information is recorded in the multi-session disk.

In the example shown in the drawing, session 1 including a lead-in area LIA1, a program area PA1 and a lead-out LOA1, session 2 including a lead-in LIA2, a program area PA2 and a lead-out LOA2, and session 3 including a lead-in LIA3, a program area PA3 and a lead-out LOA3 are recorded. data is recorded in the program area PA1 of the session 1 and the program area PA3 of the session 3, and the image area information of the formed image is recorded in the program area PA2 of the session 2.

Accordingly, the image area information can be recorded as the main data of the program area in the second kind of optical disk.

FIG. 20A is a drawing showing an example of a definition of data byte constituting a 1 sector (2048 byte) when recording the image area information as the main data of the program area.

In the example shown in the drawing, a recognition code indicative of the image area information is recorded in 0th to 3rd byte, information indicative of a number of additional writes in 4th to 7th byte, information indicative of a shape of image in 8th to 11th byte, first polar coordinate information in 12th to 15th byte, second polar coordinate information in 16th to 19th byte, and information which is necessary for indicating area of the formed image, in this order.

Incidentally, to meet the requirement for sectors in compliance with the standard format, the above data are repeatedly recorded. For example, if 16 sectors are required, the sector is repeatedly recorded 16 times.

FIG. 20B is a drawing showing a concrete example in which the image area information is recorded. The example in the drawing shows a case of the image area information R (A, B) and R(C, D) in which an area of the image is grasped as rectangle as described in 1.2-1.

R(Rectangle) which represents a rectangle as the shape of the image is recorded in 8th to 11th byte, coordinate information A(r1, θa) at a first point in 12th to 15th byte, and the second coordinate information B(r2, θ2) at a second point in 16th to 19 byte. Further, coordinate information C(r3, θ3) at a first point of a second rectangle is recorded in 20th to 23th byte, and coordinate information D(r4, θ4) at a second point of the second rectangle in 24th to 27th byte. In the example, since information R representing the shape of data is same, the recording of the information representing the second rectangle is omitted. However, the recording may not be omitted and can be recorded.

1.4. Arrangement of Optical-disk Recording Apparatus

FIG. 7 is a block diagram showing an arrangement of an optical-disk recording apparatus, which executes the method for forming a visible image on the optical disk according to the first embodiment of the invention. With this arrangement, recording and reproducing of data and image formation can be performed on both the first and second kinds of the optical disk.

The optical-disk recording apparatus in the present embodiment is arranged with an optical-disk drive 20 for performing a recording/reproducing of data to/from and forming a visible image to the optical disk 1, and a host apparatus 40, such as a host computer or a back-end apparatus, connected to the optical-disk drive 20. The host apparatus 40 is loaded with an image-edit program for editing an additional visible image and a control program for recording data or a visible image to the optical disk 1 and reproducing data therefrom. Note that the functions the host computer 40 possesses may be executed by the optical-disk drive 20.

As shown in the figure, the optical-disk drive 20 includes a spindle motor 21 for rotatively driving the optical disk 1, an optical pickup 22, an RF amplifier 23, a servo circuit 24, a decoder 25, an address detecting circuit 26, an HF-signal detecting circuit 27, a controller 28, an ALPC (automatic laser beam power control) circuit 29 for controlling the laser beam power, a buffer memory 30, an encoder 31, a strategy circuit 32 and a laser beam driver 33 for driving a laser diode of the optical pickup 22.

The optical pickup 22 applies a laser beam to the optical disk to record and reproduce data to and from the optical disk 1 and forms a visible image. The return-light reception signal (EFM-modulated or 8-to-16-modulated RF signal), as a result of the application of the laser beam to the optical disk 1, is amplified in the RF amplifier 23 and then supplied to the servo circuit 24, the decoder 25, the address-detecting circuit 26 and the HF-signal detecting circuit 27.

The servo circuit 24 takes rotation control of the spindle motor 21 and focus and tracking control of the optical pickup 22, based on the signal from the RF amplifier and the control signal from the controller 28.

The decoder 25 demodulates the EFM-modulated or 8-to-16-modulated signal supplied from the RF amplifier, and outputs reproduced data. In the case that the optical disk is the first kind, when the image area information is being recorded in the inner information area 2 or the outer information area 3 by such direct recording as shown in FIG. 6A, or in the case that the optical disk is the second kind, when the positional coordinate information is being recorded in the session, the decoder 25 reproduces the image area information.

The address detecting circuit 26 extracts a wobble-signal component from the signal supplied from the RF amplifier 23 and decodes the ADIP (or ATIP), thus detecting address information (position address).

The HF-signal detecting circuit 27 detects an envelope in the RF signal supplied from the RF amplifier 23 and supplies it to the controller 28. The reflectance is higher in an area where no ADIP or barcode is formed while the reflectance is lower in an area where those are formed. Accordingly, in the case that the image area information is encoded based on the presence or absence of ADIP as shown in FIG. 6B or in the case that a barcode is formed corresponding to the image area information as shown in FIG. 6C, the image area information can be reproduced from the output of the HF-signal detecting circuit 27 according to an envelope state in the signal outputted from the HF-signal detecting circuit 27.

The buffer memory 30 stores the information supplied from the host computer 40, i.e. the data to be recorded to the optical disk 1 (recording data) and the data of a visible image to be formed on the optical disk 1.

The encoder 31 performs an EFM-modulation or 8-to-16-modulation of the recording data or visible image data read from the buffer memory 30, and outputs it to the strategy circuit 32.

The strategy circuit 32 performs a time-base correction, etc. on the signal supplied from the encoder 31 and outputs it to the laser beam driver 33.

The laser beam driver 33 drives the laser diode of the optical pickup 22, based on the modulated signal supplied from the strategy circuit 32 under the control of the ALPC circuit 29.

As noted before, the optical disk 1 is formed with a mark indicative of the reference angle position. The controller 28 detects a mark indicative of the reference angle position based on the outputs from the address detecting circuit 26, decoder 25 and the like.

When forming a visible image to the optical disk 1, the controller 28 causes, in the timing of detecting a mark representative of the reference angle position, the encoder 31 to begin an encoding of the image data to be formed therearound and to begin a formation of a visible image corresponding to the image data.

This makes it possible to form a visible image at from a predetermined position of the optical disk 1.

1.5. Operation of Optical-disk Recording apparatus

Figure 8C:
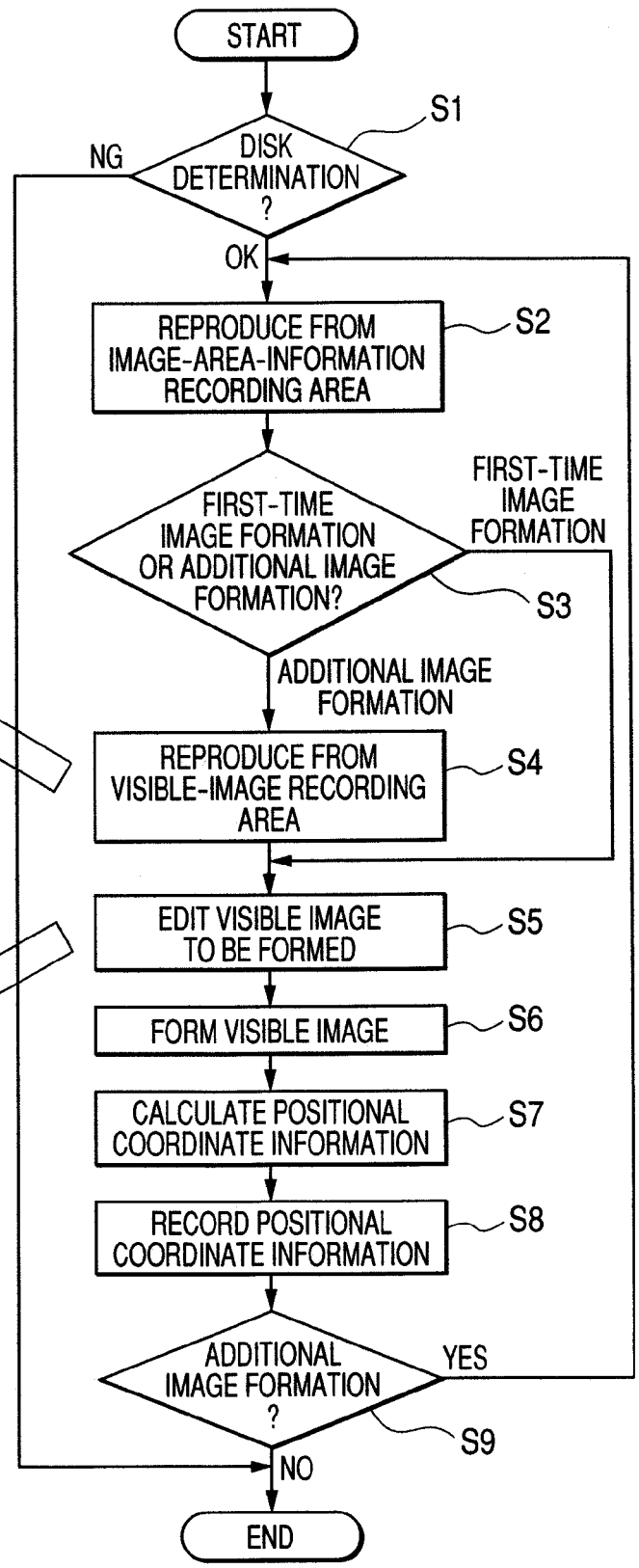
FIGS. 8A to 8C are a flowchart showing a process flow and a visible image to the optical disk according to a first embodiment in the case of using the first and second kind of optical disks.

FIG. 8C is a flowchart showing a process flow for forming a visible image on the optical disk 1 by the optical-disk recording apparatus according to the first embodiment. This flowchart can be used for both a case in which the image is formed on the first kind of optical disk and both a case in which the image is formed on the second kind of optical disk, When the user sets the optical disk 1 on the optical-disk drive 20, first, the optical-disk drive 20 determines whether the optical-disk thus set up is an optical disk to which a visible image can be additionally formed (step S1). When the set disk is a disk to which a visible image cannot be additionally written, the process is ended.

When the set disk is an optical disk to which a Visible image can be additionally formed and is the first kind of optical disk, the optical-disk drive reproduces the image area information recording area in the inner information area 2 or outer information area 3, and when the set disk is the second kind of optical disk, the optical-disk drive reproduces the program area of the data recording layer (step S2), thereby determining whether or not image area information is recorded(step S3).

When image area information is not recorded, the process proceeds to step S5 because it is the first time to form a visible image (first round of recording).

When image area information is read out, the process proceeds to step S4 where the optical disk 1 and the visible-image area formed on the disk surface are displayed on the display connected to the host computer 40 based on the image area information thus read out. Namely, the shape corresponding to the shape information in the image area information read out is displayed as an image having a size corresponding to the size information of the image area information and in a position corresponding to the position information of the image area information. When the optical disk is the second kind of optical disk, and the session in which the image area information is recorded is read out plural times, the image area information recorded last time is used. Then, the process proceeds to the step S5.

Figure 8A:
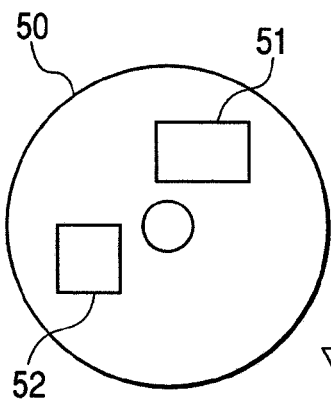

FIG. 8A exemplifies the manner of displaying the visible-image area formed on the disk surface of the optical disk 1 by reproduction, based on the image area information read out. As shown in the figure, the manner is reproduced that two visible images shown as areas 51, 52 are formed within the outline 50 of the optical disk 1.

At step S5, the user uses an image-edit program on the host computer 40, to edit and determine an image to be desirably formed on the visible-image recording area 4 of the optical disk 1 or on the image forming layer. In the case of additionally form a visible image at this time, the existing-visible-image area being displayed and the additional image are edited by use of the screen displaying the existing-visible-image area reproduced at the step S4. By the editing, determination is made on the arrangement and size of the additional image relative to the area of the existing visible image. In the first time of recording, an optical-disk outline is displayed on an edit screen. The user selects, for example, a desired thumbnail image and writes a desired character, to determine a visible image to be additionally written, then determining a position thereof.

Figure 8B:
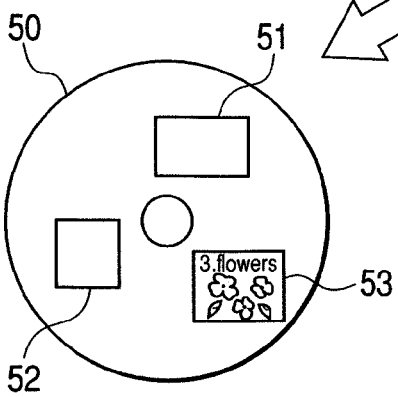

FIG. 8B shows the manner of an additional image being displayed on the edit screen during performing the process of the step S5. As shown in the figure, an additional visible image 53 is edited and displayed together with the existing visible image areas 51, 52.

When the additional visible image is determined, the host computer 40 sends the additional visible-image data to the optical-disk drive 20. The optical-disk drive 20 drives a laser beam and forms the visible image on the optical disk 1 at its designated position corresponding to the editing (step S6).

Then, the host computer 40 calculates image area information representing the position, shape and size of the added visible image in the manner as explained related to FIGS. 2 to 5 (step S7).

Figure 6:
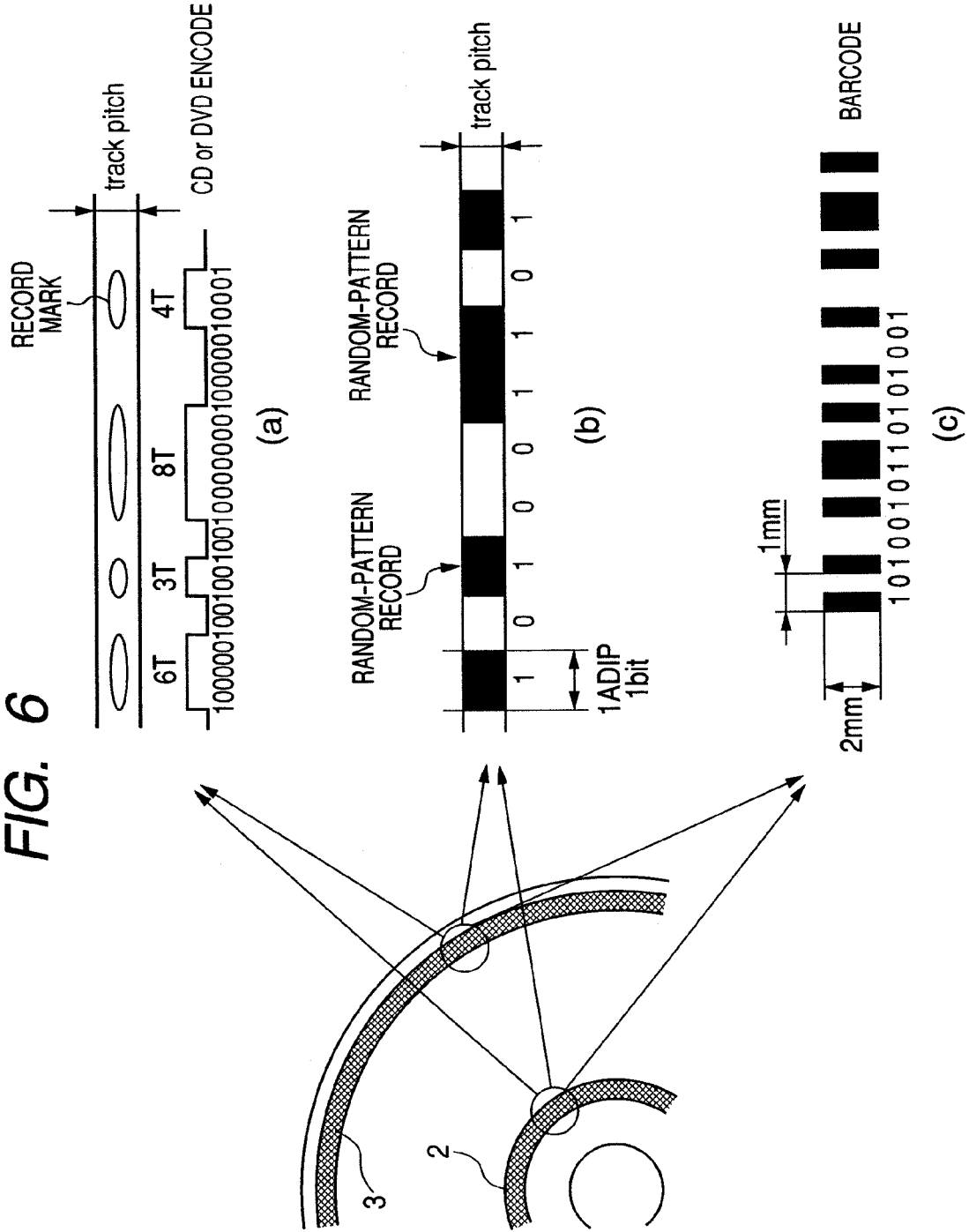

Then, when the optical disk 1 is the first kind of optical disk, the image area information thus calculated is recorded in the inner information area 2 or outer information area 3 of the optical disk 1 by using any of the recording methods explained related to FIG. 6. When the optical disk 1 is the second kind of optical disk, the image area information thus calculated is recorded by TAO or SAO in the program area (step 8). In this case, the image area information in which the image which is added at this editing operation is added to the image which has been formed prior to this editing operation is recorded.

When a visible image is additionally formed furthermore, the process returns to the step S2. When a visible image is not additionally formed, the process is ended (step S9).

In the above description, in the case of using the second kind of optical disk, the image area information for the image which is recorded on the disk surface after the image is added is recorded every time the image is added. However, this is not limited thereto. In the same manner as in the case of using the first kind of optical disk, the image area information corresponding to the added image may be recorded in a new section, and data of all sessions in which the positional information may be read out and combined to display it on the display.

Incidentally, in the embodiment, the point contained in the image area information is represented by a polar coordinate. However, this is not limited thereto but an orthogonal coordinate system may be used with the optical-disk center as an origin, a particular radial direction as an X-axis and a radial direction orthogonal to the same as a Y-axis.

Second Embodiment

Since the second embodiment includes the same arrangement as in the first embodiment, the description thereof common to the first embodiment is omitted.

2.1.1 First Kind of Optical Disk Used in Second Embodiment

A first kind of optical disk used in the second embodiment has almost same arrangement as the first kind of optical disk used in the first embodiment. In the second embodiment, when a visible image is formed on the visible-image recording area 4 for the first time, an identification number unique to the optical disk 1 is recorded in the inner information area 2 or the outer information area 3. At the same time, the identification number unique to the optical disk 1 is stored in the host apparatus. When a visible image is formed on the optical disk 1 at its visible-image recording area 4, image data, representing the image of entire optical-disk surface on which a visible image is formed, is stored in the host-apparatus side with associating it with the identification number of the optical disk 1. Accordingly, when a new visible image is additionally formed on the visible-image recording area 4 of the optical disk 1 later, the identification number is read from the optical disk 1. When the image data corresponding to the identification number is stored in the host apparatus, the newest image data is displayed on an edit screen by an image-edit program. By reproducing the visible image already formed on the optical disk, a visible image in an arbitrary form can be formed in a desired arrangement without encountering an overlap with the existing visible image, 2.1.2 Second Kind of Optical Disk Used in Second Embodiment A second kind of optical disk used in the second embodiment has almost the same arrangement as the second kind of optical disk used in the first embodiment. In the second embodiment, when data is recorded on the CDR data recording layer, an identification number for identifying the disk is recorded in a program memory area (PMA) when recording the data. Here, the identification number of the disk can be used as the identification number unique to the optical disk.

2.2.1. Method of Recording Identification Number in First Kind of Optical Disk

The identification number is recorded on the first kind of optical disk in the same manner as the method of recording the image area information described in Section 1.3 and FIGS. 6A to 6C of the first embodiment.

According to the first method as shown in FIG. 6A, the identification number is encoded by a predetermined coding method and a mark and space are formed alternately in the track of the outer or inner information area 2 or 3 based on the encoded identification number.

According to the second method as shown in FIG. 6B, bits of the identification number is assigned respectively to sectors into which the track of the outer or inner information area 2 or 3 is divided by a predetermined length and the sectors are formed in a state to be optically distinguished according to a bit value of the bits.

According to the third method as shown in FIG. 6C, a barcode corresponding to the identification number is radially formed in the inner or outer information area 2 or 3.

2.2.2. Method of Recording Identification Number in Second Kind of Optical Disk

The program memory area (PMA) is provided inside a lead-in area, and information concerning the record on the disk is encoded in a sub-code Q channel. The information includes track number having start time and stop time, which is index information of the disk in which data is partially recorded, and disk identification number for identifying each disk. However, in the case of disk-at-once (DAO) recording in which data is recorded in whole disk by one writing operation without interruption, use of PMA is option and there are many cases that PMA is not recorded.

Figures 21A, 21B:
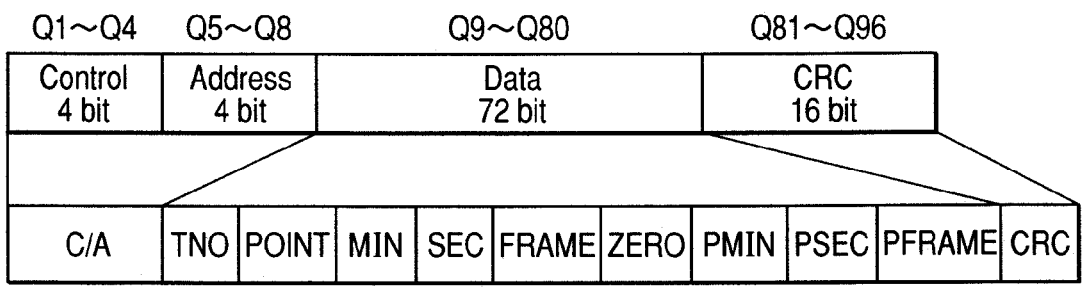
FIGS. 21A and 21B are drawings for explaining sub-code.

FIG. 21A shows a structure of sub-code, and FIG. 21B shows a frame structure of sub-code Q cannel.

As shown in FIG. 21A, one symbol constituted by 8 bits are recorded in one frame, and one block is constituted by 98 frames. Top two frames S0 and S1 are synchronization pattern and bits of P1-P96, Q1-Q96, R1-R96, S1-S96, T1-T96, U1-U96, V1-V96, W1-W96 of the remaining 96 frames constitute P to W channels.

As shown in FIG. 21B, of sub-code Q channel constituted by each bit of Q1-Q96, Q1-Q4 are control, Q5-Q8 are address, Q9-Q80 are data and Q81-Q96 are CRC (Cyclic Redundancy Code). 72 bits of Q9-Q80 are further divided into 9 parts, each having 8 bits, that is, TNO, POINT, MIN, SEC, FRAME, ZERO, PMIN, PSEC and FRAME.

Standard provides that BCD-coded 6 digit identification number is recorded in portions of 24 bits of MIN, SEC and FRAME in first 10 frames of sub-code Q channel.

FIG. 22 shows a state in which the disk identification number is recorded in the sub-code Q channel of PMA. As shown in this figure, disk identification number "123456" is repeatedly recorded in portions of MIN, SEC and FRAMEs in 1 to 10 frames. Incidentally, "02" of C/A (control and address) indicates the fact that the disk identification number is recorded in MIN, SEC and FRAME, and number (0-9) for labeling successive frames is recorded in ZERO.

In view of above, the disk identification number of 6 digits for identifying the disk is recored in PMA of the second kind of optical disk when the data is recorded by method other than disk-at-one (DAO) recording.

By using the disk identification number as the identification number unique to the disk, it is not necessary to execute a step of recording the identification number at the time of image formation.

2.3. Structure of Optical-disk Recording Apparatus

An optical-disk recording apparatus, which executes the method for recording a visible image to the optical disk according to the second embodiment of the invention will be described. The structure of the optical-disk recording apparatus according to the second embodiment is almost the same as the optical-disk recording apparatus to the first embodiment and differs from it in the following aspects.

The storage section is adapted to store the image data representative of the surface entirety of the optical disk 1 on which a visible image is formed.

When the identification number is recorded in the inner information area 2 or the outer information area 3 by such direct recording as shown in FIG. 6A, the decoder 25 is to reproduce the identification number. In the case that the identification number is encoded based on the absence or presence of ADIP as shown in FIG. 6B or in the case that a barcode is formed corresponding to the identification number as shown in FIG. 6C, the identification number can be reproduced from the output of the HF-signal detecting circuit 27 according to an envelope state in the signal outputted from the HF-signal detecting circuit 27.

2.4.1. Operation of Optical-disk Recording Apparatus in case of Using First Kind of Optical Disk In the optical-disk recording apparatus of the second embodiment, when forming a visible image on the first kind of optical disk 1 for the first time, the identification number unique to the optical disk 1 is recorded in the optical disk 1 at its inner information area 2 or outer information area 3 as well as to the host apparatus 40, as described before. Meanwhile, when forming a visible image on the optical disk 1, the image data of the optical disk 1 on which the visible image is formed is stored in the host apparatus 40 with associating it with the identification number of the optical disk 1.

Here, the various ones of data used in the second embodiment are defined as in the following.

$B^x_0$: identification number (information B) uniquely provided to the optical disk x, $C^x_n$: image data (information C, stored in the host apparatus 40) on the optical disk x, G: image data in image data $C^x_n$, C': image data added by the user, B0-exist: flag representative of the presence or absence of an identification number recorded on the optical disk 1 ("0": absent, "1": present).

Here, n denotes the number of addition cycles in which n=0 represents the state the first time of the image formation is over, n=1 the state the first time of additional image formation is over and n=k the state the n-th time of additional image formation is over.

FIG. 9 shows an example of such pieces of information B (identification number) and information c (image data of the optical disk on which a visible image is formed).

(1) of FIG. 9 shows image data $C^1_0$ on the first optical disk (x=1) on which the identification number $B^1_0$ and the visible image are formed after a visible image has been formed for the first time. In the illustrated example, the first optical disk has an identification number $B^1_0$ of "ABCDEFGH" while the image data $C^1_0$ of the optical disk on which a visible image is formed is given a file name "abcdefgh.bmp" corresponding to the identification number.

(2) of FIG. 9 shows $B^1_0$ and $C^1_0$ on the first optical disk (x=1) at the time after the first time of additional image formation has been made to the first optical disk. Because the identification number of the optical disk is recorded at the first time of image formation, there is no change in $B^1_0$ ("ABCDEFGH"). Meanwhile, the image data $C^1_1$ of after making the first time of additional image formation has the same file name "abcdefgh.bmp" as the image data of the optical disk in the time after the first time of image formation. Namely, the image data of after the first time of image formation has been erased away by overwrite.

(3) of FIG. 9 shows an example of an identification number $B^2_0$ of a second optical disk (x=2) and the image data $C^2_0$ to be stored in the host apparatus 40, at the time a visible image has been formed for the first time. In the illustrated example, the identification number $B^2_0$ is "ACEGIKMO" while the image data $C^2_0$ has a file name "acegikmo.bmp" corresponding to that.

(4) of FIG. 9 shows an identification number $B^3_0$="01234567" of a third optical disk (x=3) and the image data $C^3_0$="01234567.bmp", at the time a visible image is formed on it for the first time.

In this manner, the information B and the information C, on the host-apparatus side, always exist in the one-to-one relationship. In the illustrated example, the file name of the information C is given the same name as the identification number of the optical disk. Even when a visible image is additionally formed, the file name of the information C is not changed but the image data of after additional image formation is stored by overwrite ((2) of FIG. 9). Accordingly, by reading out a file having a name of an optical-disk identification number, the information C, i.e. the existing image data of the optical disk, can be read out and displayed on the screen of the display section.

Incidentally, this is not limitative, i.e. it is satisfactory to store the information B and the information C in a one-to-one corresponding relationship. The file of the information C may be of single-layer data, a plurality of image data layers stacked, or a combination of image data and position information.

Figure 10:
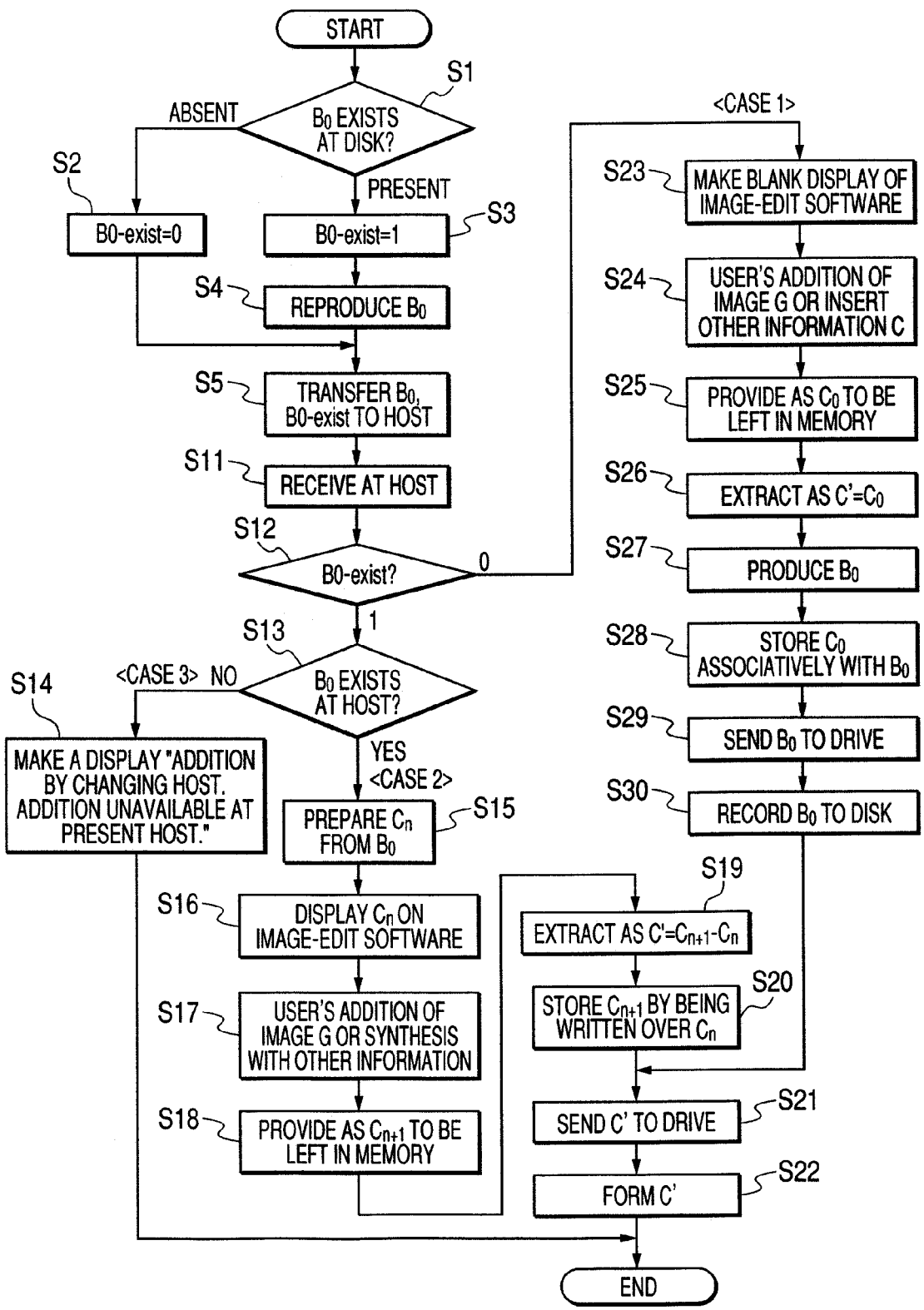
FIG. 10 shows a flowchart showing a process flow on the optical-disk recording apparatus according to a second embodiment in the case of using the first kind of optical disk.

FIG. 10 is a flowchart showing a process flow on the optical-disk recording apparatus according to the second embodiment. Note that, in FIG. 10, the information $B^x_0$ and the information $C^x_n$ are denoted omitted of x in order to avoid the troublesomeness.

When the optical disk 1 is inserted to the optical-disk drive 20, the optical-disk drive 20 determines whether or not the disk is the first kind of optical disk capable of forming a visible image. In the case that it is not a media compatible with visible-image formation, the process ends as error. When the disk is the first kind of optical disk capable of forming a visible image, the flowchart in FIG. 10 is executed.

At first, the inner information area 2 or outer information area 3 of the optical disk 1 is read to determine whether or not there is a record of identification information (information $B^x_0$) (step S1).

When information $B^x_0$ is not recorded, the flag B0-exist is set "0" (step S2).

When information $B^x_0$ is recorded, the flag B0-exist is set "1" (step S3) and the information $B^x_0$ is reproduced (step S4).

Then, the flag B0-exist and the information $B^x_0$ reproduced are sent to the host apparatus 40 (step S5).

When receiving the information of the flag B0-exist, etc. from the optical-disk drive 20 (step S11), the host apparatus 40 determines whether the received flag B0-exist is "0" or "1".

When the flag B0-exist is "0", it is determined that an unrecorded media is inserted and it is the first time a visible image is formed (case 1), and hence the process proceeds to step S23.

When the flag B0-exist is "1", it is determined whether or not the $B^x_0$ same as the information $B^x_0$ (identification number) received at the same time or the corresponding information $C^x_n$ is recorded in the own host apparatus 40 (step S13). If stored, it is determined that a visible image is to be added by the same host (case 2), and hence the process proceeds to step S15. If not stored, it is determined that addition is to be made by changing the host (case 3), and hence the process proceeds to step S14 to make an alert display.

Those cases are explained in the following.

2.4.1-1 Case 1 (First Time a Visible Image is Formed the Optical Disk)

Where an unrecorded media is inserted to form a visible image for the first time, there is no piece of information $B^x_0$ on the disk and there is no piece of information $C^x_0$ corresponding to information $B^x_0$ in the host apparatus 40. Accordingly, the existing visible image is not displayed on a screen of the image-edit program for editing a visible image (step S23). The user is to newly affix image data G and make an edition as to position, size and shape. Otherwise, utilizing the existing information C, the user draws an image to be recorded to the optical disk 1 (step S24).

The image data thus edited is stored, as information $C^x_0$ corresponding to the optical disk, to the memory of the host apparatus 40 (step S25).

The image data $C^x_0$ thus stored is taken as visible image data C to be added to the optical disk 1 (step S26).

Then, the identification number $B^x_0$ is produced that is to be given to the optical disk 1 (step S27). For example, the identification number is produced based on a random number generated using the current time as a variable.

Then, the information $C^x_0$ produced at the step S25 and the information $B^x_0$ produced at the step S27 are associated with each other and saved in the storage section, such as a hard disk, of the host apparatus 40 (step S28). Namely, the information $C^x_0$ is saved as a file having a file name $B^x_0$. At this time, the information $B^x_0$ is preferably stored in the storage section of the host apparatus 40.

Then, the information $B^x_0$ is sent to the optical-disk drive 20 (step S29).

The disk drive 20 records the information $B^x_0$ received from the host apparatus 40 in the inner information area 2 or outer information area 3 of the optical disk 1, by any of the methods shown in of FIGS. 6A to 6C (step S30).

Then, the host apparatus 40 sends the visible-image data C' of the visible image, to be additionally formed on the optical disk 1, to the optical-disk drive 20 (step S21). The optical-disk drive 20 forms the corresponding visible image on the optical disk 1 (step S22).

2.4.1-2 Case 2 (Case Visible Image is Additionally Formed by Using the Same Host Apparatus)

Explanation is now made on a case to additionally form a visible image by using the same host apparatus 40.

In this case, the information $B^x_0$ can be recognized at the optical-disk drive 20 and the information $C^x_n$ corresponding to the information $B^x_0$ exists in the host apparatus 40 (Yes at step S13). For example, when performing the second time of image formation, i.e. the first time of additional image formation, the initial recording has already been done. Accordingly, in the host apparatus 40, there are stored the information $B^x_0$ produced at that time as well as the corresponding image data $C^x_0$.

Accordingly, the information $C^x_n$ corresponding to the information $B^x_0$ is read from the storage section (step S15), and the information $C^x_n$ (image data of the optical disk 1 on which a visible image is already formed) is displayed on an edit screen of the image-edit program for editing a visible image to be formed on the optical disk 1 (step S16). This makes it possible to reproduce the existing image formed on the optical disk 1.

Using the screen, the user is allowed to make an editing by affixing image data G onto the image data $C^x_n$ or by combining it with another piece of information c stored ion the host apparatus C (step S17).

Then, the new image data $C^x_{n+1}$ thus edited is temporarily stored in the memory of the host apparatus 40 (step S18).

Then, a difference $C'=C^x_{n+1}-C^x_n$ (between the produced information $C^x_{n+1}$ and the stored information $C^x_n$) is extracted as visible-image data to be added to the optical disk 1 (step S19). Namely, by taking a difference on between each pixel of the image data $C^x_{n+1}$ where a new visible image is added and each pixel of the existing image data $X^x_n$, the image data C' is extracted for a visible image that the user desires to add.

The edited information $C^x_{n+1}$ is written over the information $C^x_n$ (step S20), thus associating it with the information $B^x_0$.

Then, the additional image data C', extracted at the step S19, is sent to the optical-disk drive 20 (step S21). The optical-disk drive 20 additionally forms the visible image on the optical disk 1 based on the image data.

2.4.1-3 Case 3 (Case Visible Image is Added by Another Host Apparatus)

Explanation is now made on a case to make an additional image formation by another host apparatus.

In this case, despite the on-disk-surface information $B^x_0$ is reproduced and the information $B^x_0$ is received from the drive, there is no information $C^x_n$ corresponding to the information $B^x_0$ in the host (No at step S13). Accordingly, the image data of the corresponding information $C^x_n$ cannot be loaded thus the existing image of the disk cannot be reproduced on the screen. Therefore, additional image formation is impossible to be performed. The process is ended by displaying a message noticing the fact thereof (step S14).

2.4.2. Operation of Optical-disk Recording Apparatus in Case of Using Second Kind of Optical Disk As described above, in the case of using the second kind of optical disk, the disk identification number recorded in the PMA of the second kind of optical disk is used as the identification number (information B).

Figure 23:
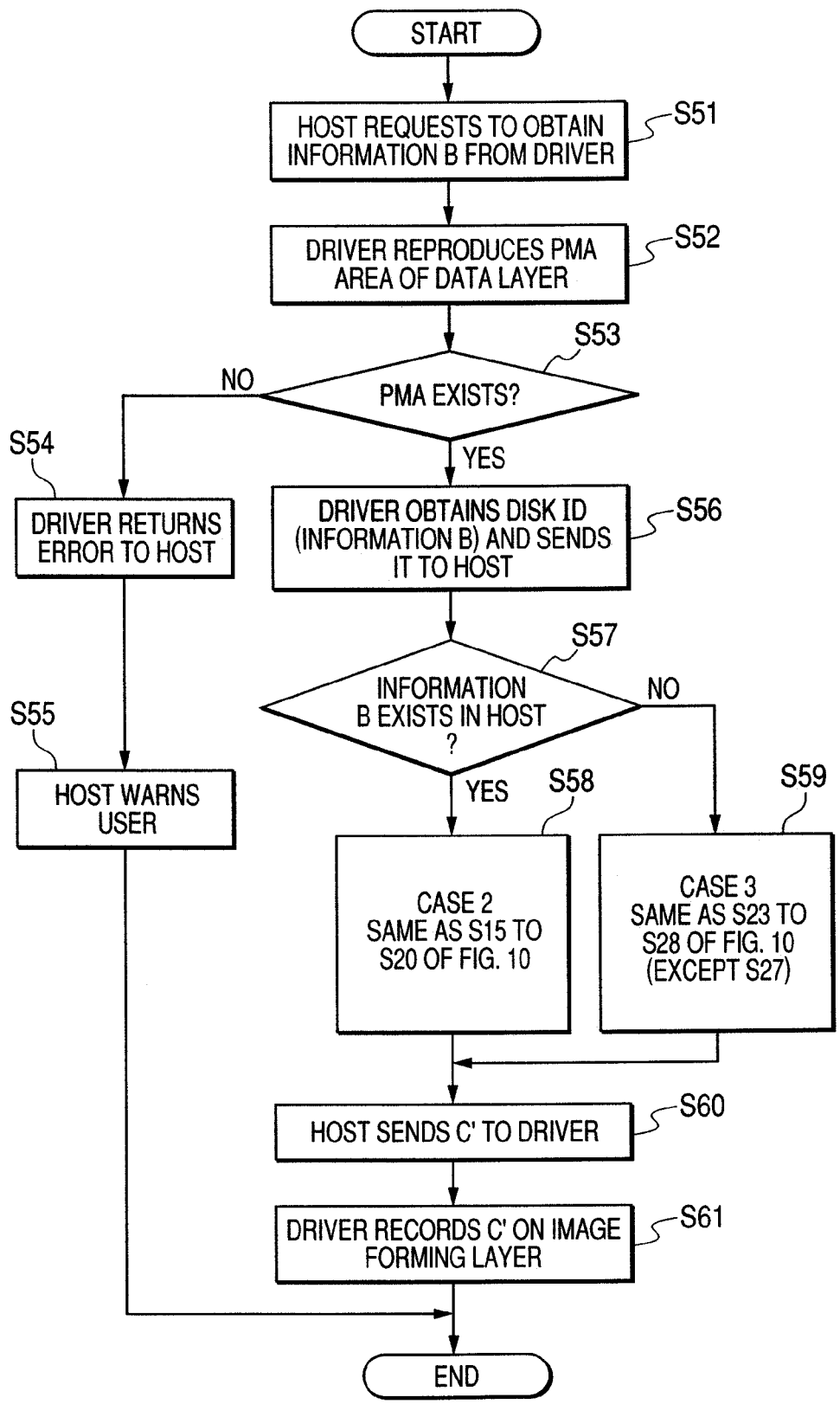
FIG. 23 is a flowchart showing a process flow on the optical-disk recording apparatus according to the second embodiment in the case of using the second kind of optical disk.

FIG. 23 shows a flowchart showing a process flow on the optical-disk recording apparatus according to the invention in the case of using the second kind of optical disk.

When an instruction for starting forming an image of the second kind of optical disk is given, the host apparatus 40 requests to obtain information B of the optical disk set in the optical-disk drive apparatus 20 (step S51).

In response to this, the optical-disk drive apparatus 20 reproduce the PMA area recorded in the data layer of the second kind of optical disk (step S52), then a determination is made as to whether PMA exits or not (step S53).

When the second kind of optical disk set is an unused disk and when disk-at-once recording has been performed on the optical disk, PMA area does not exit (No in step S53), and thus the optical-disk drive apparatus 20 returns error signal to the host apparatus 40 (step S54). In response to this, the host apparatus 40 displays a warning to the user (step S54) and process ends. For example, the user is warned by the display "additional formation may not performed properly next time. Please perform data recording before forming image."

Alternatively, the user may be urged to determine whether the image formation should be forcibly performed or not, and if the user determine to force the image formation, such a process may be formed in which a little amount of dummy data is recorded in the data layer to create PMA area.

On the other hand, if the PMA exits (Yes in step S53), the optical-disk drive apparatus 20 obtains the disk identification number (information B) recorded in PMA and transmits it to the host apparatus 40(step 56).

The host apparatus 40 determines whether the information B from the optical-disk drive apparatus 10 is stored in own apparatus or not (step S57).

As the result, if the information corresponding to the information B is stored (YES in step S57), same process as steps S15 to S20 of the case 2 (same host apparatus is used for recording image) in FIG. 10 is executed (steps S58). That is, the corresponding image data $C^x_n$ is read from the storage based on the information B ($B^x_0$), the image data $C^x_n$ is displayed on the edit screen of the image editing program, new image data $C^x_{n+1}$ as the result of the edit process such as adding image by the user is obtained, differential data as the data C' of the image to be added to the optical disk is extracted ($C'=C^x_{n+1}-C^x_n$) and new image data $C^x_{n+1}$ is overwritten on $C^x_n$.

On the other hand, if the information B is not stored (No in steps S57), process of steps S23 to S26 and S28 (S59) of the case 1 (first time to form image) is executed. That is, in the case, although the data is recorded and the PMA is recorded, an image is not formed, and thus the optical disk outline of blank format is displayed on the edit screen of the image editing program, image data $C^x_0$ as the result of the edit process such as adding image by the user is obtained, the image data $C^x_0$ is employed as the data C' of the image to be added to the optical disk ($C'=C^x_0$), and the information B ($B^x_0$) and $C^x_0$ are associated with each other and stored.

After executing step S58 or step S59, the host apparatus 40 transmits, to the optical-disk drive apparatus 20, the data C' of the image to be added to the optical disk (S60), and the optical-disk drive apparatus 20 records the data C' on the image forming layer of the second kind of optical disk (step S61).

Accordingly, the image is formed on the second kind of optical disk.

Third Embodiment

Since the third embodiment includes the same arrangement as in the second embodiment, the description thereof common to the second embodiment is omitted.

3.1.1 First Kind of Optical Disk Used in Third Embodiment

A first kind of optical disk used in the third embodiment has almost same arrangement as the first kind of optical disk used in the first embodiment, In the third embodiment, when forming a visible image on the visible-image recording area 4 for the first time, the identification number unique to the optical disk 1 is recorded in the inner information area 2 or the outer information area 3 of the optical disk. When forming the visible image in the visible-image recording area 4, the identification number unique to the optical disk 1, the image data representing the disk surface entirety of the optical disk 1 on which the visible image is formed and the information (link information) associating the image data with the identification number unique to the optical disk 1 are stored to the internal or external host computer device. Accordingly, when a new visible image is additionally formed on the visible-image recording area 4 of the optical disk 1 later, the identification number is read from the optical disk 1. When the link information associated with the identification number is stored in the host apparatus, the newest image data associated with the identification number by the link information is displayed on an edit screen of an image-edit program. By reproducing the visible image already formed on the optical disk, a visible image can be formed in a desired form arbitrary without encountering an overlap with the existing visible image, thus making it possible to additionally form the visible image on the optical disk in accordance with the arrangement on the edit screen.

3.1.2 Second Kind of Optical Disk Used in Third Embodiment

A second kind of optical disk used in the third embodiment has the same arrangement as the second kind of optical disk used in the second embodiment.

3.2.1 Method of Recording Identification Number in First Kind of Optical Disk

The identification number is recorded on the first kind of optical disk in the same manner as the method of recording the Recording Identification Number in first kind of optical disk according to the second embodiment. Thus, the description thereof is omitted.

3.2.2 Method of Recording Identification Number in Second Kind of Optical Disk

The identification number is recorded on the second kind of optical disk in the same manner as the method of recording the identification number in the second kind of Optical disk according to the second embodiment. Thus, the description thereof is omitted.

3.3. Structure of Optical-disk Recording Apparatus

The structure of the optical-disk recording apparatus according to the third embodiment has the same structure of that according to the second embodiment. Thus, the description thereof is omitted.

3.4.1. Operation of Optical-disk Recording Apparatus in Case of Using First Kind of Optical Disk In the optical-disk recording apparatus of the third embodiment, when forming a visible image on the first kind of optical disk 1 for the first time, the identification number unique to the optical disk 1 is recorded to the optical disk 1 at its inner information area 2 or outer information area 3, as described before. Meanwhile, when forming the visible image in the optical disk 1, the identification information unique to the optical disk 1, the image data of the optical disk 1 on which a visible image is formed, and the link information associating the image data with the identification number of the optical disk 1 are stored to the host apparatus 40.

Here, the various ones of data used in the invention are defined as in the following $B^x_0$: identification number uniquely provided to the optical disk x (information B), $C^x_n$: image data of the optical disk on which a visible image is formed (information C, stored in the host apparatus 30), $D^x_n$: link information associating the information B with the information C (information D, stored in the host apparatus 40), G: image data in the image data $C^x_n$, C': image data added by the user, B0-exist: flag representative of the presence or absence of an identification number recorded in the optical disk 1 ("0": absent, "1": present).

Here, n represents the number of addition cycles in which n=0 represents the state the first time of image formation is over, n=1 the state the first time of additional image formation is over and n=k the state the n-th time of additional image formation is over.

FIG. 11 shows an example of such information B (identification number), information C (image data of the optical disk on which a visible image is formed) and information D (link information).

(1) of FIG. 11 shows an identification number of the optical disk (x=1) where a visible image is formed for the first time, image data of the optical disk on which a visible image is formed and link information. In the illustrated example, the first optical disk has an identification number $B^1_0$ of "AAB-BCCDD". The image data $C^1_0$ of the optical disk on which the visible image is formed has a file having a name "picture1.bmp". The link information associating is given as $D^1_0(B^1_0, C^1_0)$.

(2) of FIG. 11 shows the data at the time after the first time of additional image formation is done to the first optical disk. Because the identification number of the optical disk is to be recorded only in the first time of image formation to the optical disk, $B^1_0$ does not change. Meanwhile, the image data $C^1_1$ after performing a first time of additional image formation is stored in the file name of "picture2.bmp". The link information associating is given as $D^1_1(B^1_0, C^1_1)$.

(3) of FIG. 11 shows an example of the data at the time when a visible image is formed on the second optical disk (x=2) for the first time. In the illustrated example, identification number $B^2_0$ is given as "ACEGIKMO". Meanwhile, the second optical disk is formed with the same visible image as that in the first time of image formation on the first optical disk. The image data is given "picture1.bum" the same as $C^1_0$ while the link information is given $D^2_0(B^2_0, C^1_0)$.

(4) of FIG. 11 shows an example of the data at the time when a visible image is formed on the third optical disk (x=3) for the first time. The optical disk has an identification number $B^3_0$ of "01234567". The third optical disk is formed with the same visible image as the visible image of after performing the first time of additional image formation to the first optical disk. The image data is given as "picture2.bmp" the same as that of $C^1_1$ while the link information is as $D^3_0(B^3_0, C^1_1)$.

The file as the information C may be in single-layer data, a plurality of layered image data or a combination of image data and position information.

In this manner, to the host apparatus side are stored the identification information (information B) of the optical disk, the image data (information C) of the optical disk on which a visible image is formed and the link information (information D) associating between the identification information of the optical disk and the image data of the optical disk on which the visible image is formed. Accordingly, by referring the link information based on the optical-disk identification number and reading the image data from the optical disk on which the visible image is formed, the existing image on the optical disk can be displayed on the display screen. Meanwhile, because the identification number and the image data are associated together and linked by the link information, it is possible to reduce the storage capacity required in such a case that the same visible image is formed onto a plurality of optical disks, as compared to the case where image data is stored on each optical disk.

Figure 12:
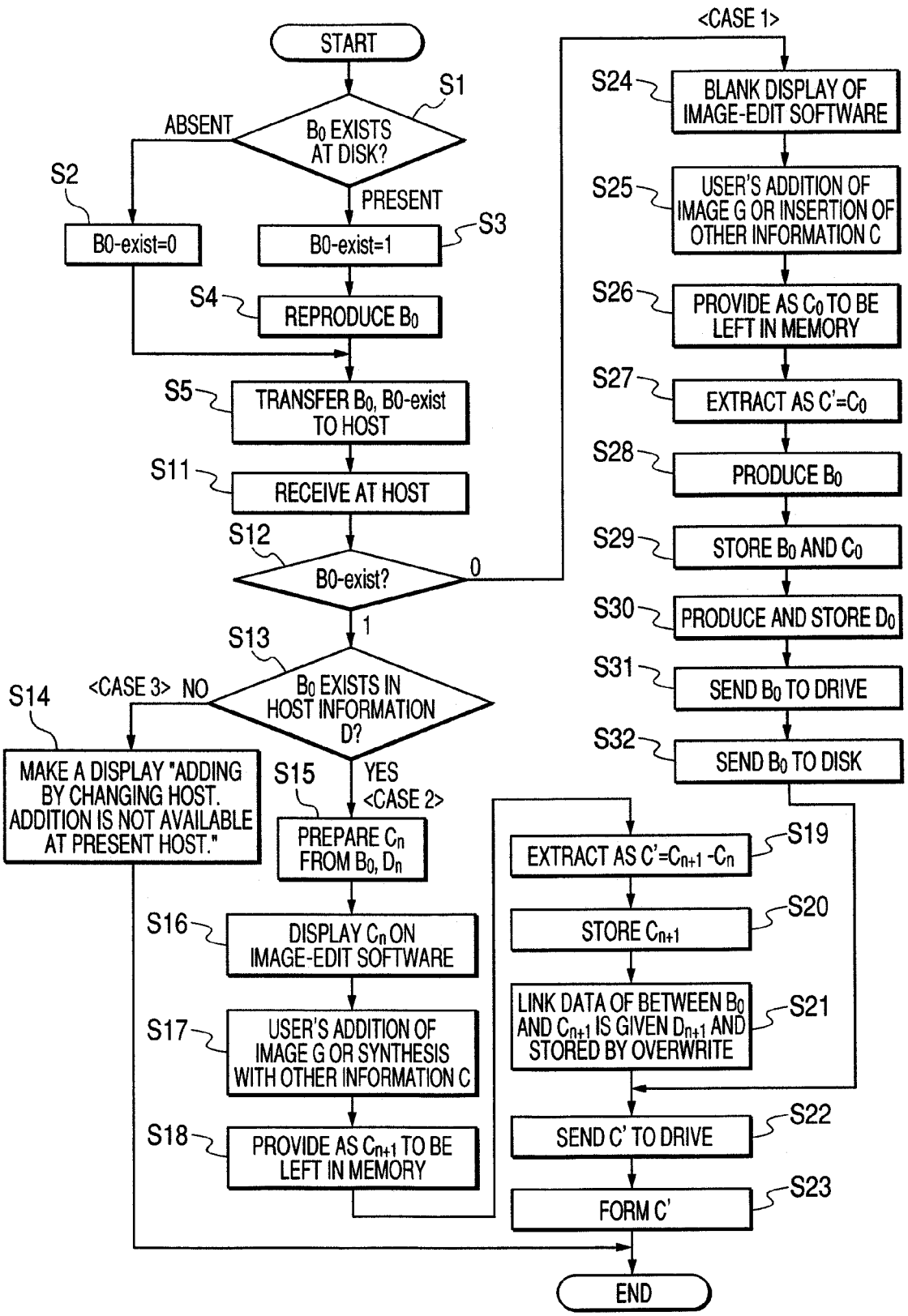
FIG. 12 is a flowchart showing a process flow on the optical-disk recording apparatus according to a third embodiment in the case of using the first kind of optical disk.

FIG. 12 is a flowchart showing a process flow on the optical-disk recording apparatus according to the third embodiment. Note that, in FIG. 12, the information $B^x_0$, the information $C^x_n$ and the information $D^x_n$ are denoted omitted of x in order to avoid the troublesomeness.

When the optical disk 1 is inserted to the optical-disk drive 20, the optical-disk drive 20 determines whether or not the disk is capable of forming a visible image. In the case that it is not a media compatible with visible-image formation, the process ends as error. When the disk is an optical disk capable of forming a visible image, the flowchart in FIG. 12 is executed.

At first, the inner information area 2 or outer information area 3 of the optical disk 1 is read to determine whether or not there is a record of identification information (information $B^x_0$) (step S1).

When information $B^x_0$ is not recorded, the flag B0-exist is set "0" (step S2).

When information $B^x_0$ is recorded, the flag B0-exist is set "1" (step S3) and the information $B^x_0$ is reproduced (step S4).

Then, the flag B0-exist and the information $B^x_0$ reproduced are sent to the host apparatus 40 (step S5).

When receiving the information of the flag B0-exist, etc, from the optical-disk drive 20 (step S11), the host apparatus 40 determines whether the received flag B0-exist is "0" or "1".

When the flag B0-exist is "0", it is determined that an unrecorded media is inserted to form a visible image for the first time (case 1), and the process proceeds to step S24.

When the flag B0-exist is "1", it is determined whether or not the information $D^x_n$ corresponding to the information $B^x_0$ (identification number) received at the same time is stored in the own host apparatus 30 (step S13). If it is stored, it is determined that a visible image is to be additionally formed by using the same host apparatus (case 2), and the process proceeds to step S15. If it is not stored, it is determined that an additional image formation is to be performed by another host apparatus (case 3), and the process proceeds to step S14. Note that the determination at the step S13 may be made by checking the information $B^x_0$ stored in the host apparatus 30.

Each of the cases will be explained in the following, 3.4.1-1 Case 1 (Case to Form a Visible Image on the Optical Disk for the First Time)

Where an unrecorded media is inserted to form a visible image for the first time, information $B^x_0$ does not exist on the disk and the pieces of information $B^x_0$, $C^x_0$ and $D^x_0$ do not exist in the host apparatus 40. Accordingly, no existing visible image is displayed on the screen of the image-edit program for editing an additional visible image (step S24). The user edits position, size, etc. by newly putting an image G or edits the image data by using the existing information C, thus forming an image desirably on the optical disk (step S25).

The image data thus edited is stored, as the information $C^x_0$ corresponding to the optical disk, in the memory of the host apparatus 40 (step S26).

The image data $C^x_0$ stored is taken as image data C' for forming the visible image to be added to the optical disk 1 (step S27).

Then, the identification number $B^x_0$ is produced that is to be provided to the optical disk 1 (step S28). For example, the identification number is produced based on a random number generated by using the current time as variable.

The information $C^x_0$ produced at the step S26 and the information $B^x_0$ produced at the step S28 are stored in the storage section such as the hard disk of the host apparatus 40 (step S29).

Then, the link information $D^x_0$, associating the information $B^x_0$ with the information $C^x_0$, is produced and stored in the host apparatus 40 in the same manner (step S30).

The information $B^x_0$ is sent to the optical-disk drive 10 (step S31).

The optical-disk drive 20 records the information $B^x_0$ received from the host apparatus 40 in the inner information area 2 or outer information area 3 of the optical disk 1, by any of the method shown in FIGS. 6A to 6C (step S32).

Then, the host apparatus 30 sends the image data C' for forming the visible image on the optical disk 1, to the optical-disk drive 10 (step S22). The optical-disk drive 10 forms the corresponding visible image on the optical disk 1 (step S23).

3.4.1-2 Case 2 (Case to Additionally Form a Visible Image by Using the Same Host Apparatus)

Explanation is now made on a case to additionally form a visible image by using the same host apparatus 30.

In this case, the information $B^x_0$ can be recognized at the optical-disk drive 20 in which information $D^x_n$ exists in the host apparatus 40 (Yes at the step S13). For example, when performing the second time of the image formation, i.e. the first time of additional image formation, the initial image formation has already been done. Hence, the information $B^x_0$, $C^x_0$ and $D^x_0$ ($B^x_0$, $C^x_0$) produced at that time is being stored in the host apparatus 40.

Accordingly, using the information $D^x_0$, the information $C^x_n$ corresponding to the information $B^x_0$ is read from the storage section (step S15). The information $C^x_n$ (image data of the optical disk 1 on which a visible image is already formed) is displayed on the edit screen of the image-edit program for editing the visible image to the optical disk 1 (step S16). This makes it possible to reproduce the existing image formed on the optical disk 1.

Referring the screen, the user edits the additional visible image by newly putting an additional image G onto the image data $C^x_n$ or combining it with another piece of information C stored in the host apparatus 30 (step S17).

The edited image data $C^x_{n+1}$ is temporarily recorded in the memory of the host apparatus 30 (step S18).

Then, a difference C'=$C^x_{n+1}$-$C^x_n$ (between the information $C^x_{n+1}$ produced and the information $C^x_n$ stored) is extracted as image data of a visible image to be added to the optical disk 1 (step S19). Namely, by taking a difference on between each pixel of the image data $C^x_{n+1}$ where a new visible image is added and each pixel of the existing image data $C^x_n$, the image data C' is extracted for a visible image the user desires to add.

Then, the image data $C^x_{n+1}$ produced is stored in the host apparatus 40 (step S20). At this time, the image data $C^x_n$ is possibly used for another optical disk and hence stored as it is.

Then, the link information $D^x_{n+1}$($B^x_0$, $C^x_{n+1}$), associating the identification number $B^x_0$ with the image data $C^x_{n+1}$ produced at the step S18, is produced and written over the link information $D^x_n$ (step S21). In this manner, the link information $D^x_n$ one generation before is erased to store only the newest link information $D^x_{n+1}$. Accordingly, when inserting an optical disk having an identification number $B^x_0$, the newest image data $C^x_{n+1}$ of the optical disk can be read out based on the link information $D^x_{n+1}$.

Then, the additional data C' extracted at the step S19 is sent to the optical-disk drive 10 (step S22). The optical-disk drive 10 additionally forms the visible image based on the image data (step S23).

3.4.1-3 Case 3 (Case to Additionally Form a Visible Image by Another Host Apparatus)

Explanation is now made on a case to perform an additional image formation by another host apparatus.

In this case, although the information $B^x_0$ on the optical disk 1 is reproduced and the information $B^x_0$ is received from the drive, there is neither information $B^x_0$ nor information $D^x_n$ corresponding to the information $B^x_0$ in the host apparatus (No at the step S13). Thus, it is impossible to load the image data of the corresponding information $C^x_n$ and hence the existing image cannot be produced on the screen. Thus, additional image formation is impossible to perform, and an alert message of the fact is first displayed thereby ending the process (step S14).

3.4.2 Operation of Optical-disk Recording Apparatus in Case of Using Second Kind of Optical Disk As described above, in the case of using the second kind of optical disk, the disk identification number recorded in the PMA of the second kind of optical disk is used as the identification number (information B).

Figure 24:
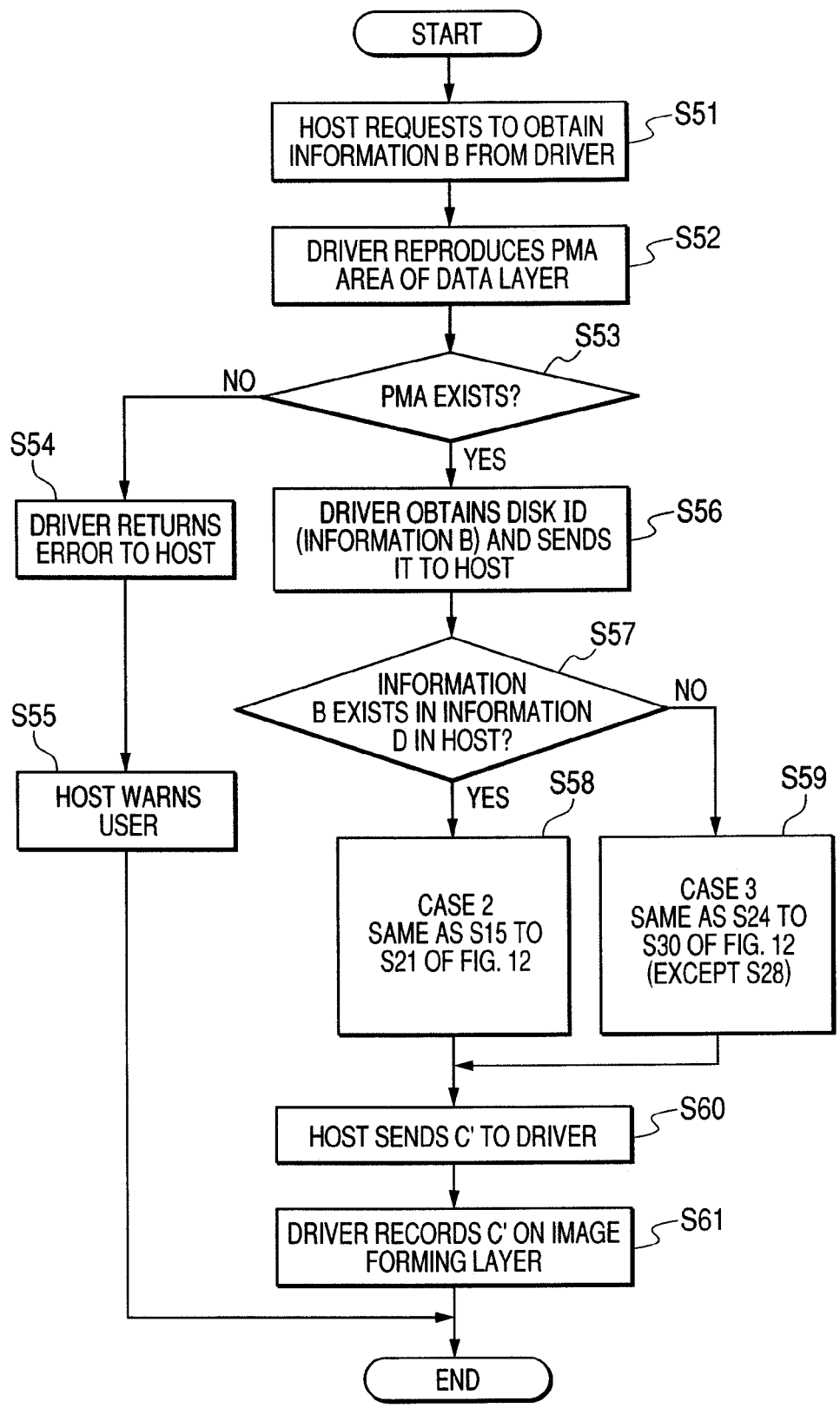
FIG. 24 is a flowchart showing a process flow on the optical-disk recording apparatus according to the third embodiment in the case of using the second kind of optical disk.

FIG. 24 shows a flowchart showing a process flow on the optical-disk recording apparatus according to the invention in the case of using the second kind of optical disk.

When an instruction for starting forming an image of the second kind of optical disk is given, the host apparatus 40 requests to obtain information B of the optical disk set in the optical-disk drive apparatus 20 (step S51).

In response to this, the optical-disk drive apparatus 20 reproduce the PMA area recorded in the data layer of the second kind of optical disk (step S52), then a determination is made as to whether PMA exits or not (step S53).

When the second kind of optical disk set is an unused disk and when disk-at-once recording has been performed on the optical disk, PMA area does not exit (No in step S53), and thus the optical-disk drive apparatus 20 returns error signal to the host apparatus 40 (step S54). In response to this, the host apparatus 40 displays a warning to the user (step S54) and process ends. For example, the user is warned by the display "additional formation may not performed properly next time. Please perform data recording before forming image."

Alternatively, the user may be urged to determine whether the image formation should be forcibly performed or not, and if the user determine to force the image formation, such a process may be formed in which a little amount of dummy data is recorded in the data layer to create PMA area.

On the other hand, if the PMA exits (Yes in step S53), the optical-disk drive apparatus 20 obtains the disk identification number (information 8) recorded in PMA and transmits it to the host apparatus 40.

The host apparatus 40 determines whether the information B from the optical-disk drive apparatus 10 is stored in own apparatus or not (step S57).

As the result, in the case that the link information $D^x_n$ including the information B is stored (YES in step S57), the same process as the process of steps S15 to S21 in the case 2 (same host apparatus is used to add image) is executed (step S58). That is, the image data $C^x_n$ corresponding to the information B is read out from the storage using the information $D^x_n$, the image data $c^x_n$ is displayed on the edit screen of the image editing program, the image data $C^x_{n+1}$ as the result of the edit process such as adding the image by the user is obtained, differential data as data C' of the image to be added to the optical disk is extracted (C'=$C^x_{n+1}$−$C^x_n$), and new image data $C^x_{n+1}$ is stored, and link information $D^x_{n+1}$ ($B^x_0$, $C^x_{n+1}$) associating the information $B^x_0$ with the image data $C_{x_{n+1}}$ is created and overwritten on the stored link information $D^x_n$.

On the other hand, if the link information $D^x_n$ including the information B is not stored (No in steps S57), the process of steps S24-S27, S29 and S30 of the case 1 (first time to form image) as shown in FIG. 12 is executed (step S59). That is, in the case, although the data is recorded and the PMA is recorded, an image is not formed, and thus the optical disk of blank format is displayed on the edit screen of the image editing program, image data $C^x_0$ as the result of the edit process such as adding image by the user is obtained, the image data $C^x_0$ is employed as the data C' of the image to be added to the optical disk (C'=$C^x_0$), and link information $D^x_0$ ($B^x_0$, $C^x_0$) associating the information B with the image data $C^x_0$ is created and stored in the storage.

After executing step S58 or step S59, the host apparatus 40 transmits, to the optical-disk drive apparatus 20, the data C' of the image to be added to the optical disk, and the optical-disk drive apparatus 20 records the data C' on the image forming layer of the second kind of optical disk (step S61).

Accordingly, the image is formed on the second kind of optical disk.

Fourth Embodiment

Since the fourth embodiment includes the same arrangement as in the first embodiment, the description thereof common to the first embodiment is omitted.

4.1.1 First Kind of Optical Disk Used in Fourth Embodiment

A first kind of optical disk used in the fourth embodiment has almost same arrangement as the first kind of optical disk used in the first embodiment. In the fourth embodiment, when a visible image is formed on the visible-image recording area 4 for the first time, an identification number unique to the optical disk 1 is recorded to the inner information area 2 or outer information area 3. When forming the visible image to the visible-image recording area, the image area information representing a position, shape and size of the visible image formed on the optical disk 1, is recorded to the inner information area 2 or the outer information area 3. Simultaneously, the image data capable of representing the entire surface of the optical disk 1 on which a visible image is formed, and the information (link information) associating between the image data and the identification number unique to the optical disk 1 are stored to the host-apparatus side. Accordingly, when a new visible image is additionally formed on the visible-image recording area 4 of the optical disk 1 later, the identification number is read from the optical disk 1. When the image data corresponding to the identification number is stored in the host apparatus, the image data is displayed on an edit screen of an image-edit program, thereby reproducing the visible image already formed on the optical disk. A visible image can be formed in an arbitrary shape into a desired arrangement without an overlap with the existing visible image. Meanwhile, even where there is no recording of image data in the host apparatus, an area of the visible image already formed on the optical disk can be reproduced and displayed by use of the image area information of the image. This makes it possible to form a new visible image into a desired arrangement without an overlap with the existing visible image.

4.1.2 Second Kind of Optical Disk Used in Fourth Embodiment

A second kind of optical disk used in the fourth embodiment has almost the same arrangement as the first kind of optical disk used in the second embodiment. In the fourth embodiment, in case of using the second kind of optical disk, when the image is formed on the image forming layer (visible image recording layer), the identification number unique to the optical disk and the image area information of the image are stored in the program area of the data recording area of the disk.

4.2. Image Area Information

The image area information according to the fourth embodiment is the same as the image area information according to the first embodiment. Thus, the description thereof is omitted.

4.3.1 Method of Recording Identification Number and Image area Information in First Kind of Optical Disk The identification number and the image area information are recorded on the first kind of optical disk in the same manner as the method in section 1.3.1 and FIGS. 6A to 6C of the first embodiment and the method in Section 2.2.1 of the second embodiment.

4.3.2 Method of Recording Identification Number and Image Area Information in Second Kind of Optical Disk The identification number and the image area information are recorded on the second kind of optical disk in the same manner as the method in section 1.3.2 of the first embodiment and the method in Section 2.2.2 of the second embodiment.

4.4 Structure of Optical-disk Recoding Apparatus

An optical-disk recording apparatus, which executes the method for recording a visible image to the optical disk according to the fourth embodiment of the invention will be described. The structure of the optical-disk recording apparatus according to the second embodiment is almost the same as the optical-disk recording apparatus to the first embodiment and differs from it in the following aspects.

When the identification number and the image area information are recorded in the inner information area 2 or the outer information area 3 by such direct recording as shown in FIG. 6A, the decoder 25 is to reproduce the identification number. In the case that the identification number and the image area information are encoded based on the absence or presence of ADIP as shown in FIG. 6B or in the case that a barcode is formed corresponding to the identification number and the image area information as shown in FIG. 6C, the identification number and the image area information can be reproduced from the output of the HF-signal detecting circuit 27 according to an envelope state in the signal outputted from the HF-signal detecting circuit 27.

4.5.1 Operation of Optical-disk Recording Apparatus in Case of Using First Kind of Optical Disk In the optical-disk recording apparatus of the fourth embodiment, when forming a visible image for the first time on the first kind of optical disk 1, the identification number unique to the optical disk 1 is recorded to the optical disk 1 at its inner information area 2 or outer information area 3, as described before. Meanwhile, when forming the visible image on the optical disk 1, the image area information representing the position, shape and size of an area where the visible image occupies, is recorded to the inner information area 2 or outer information area 3. Simultaneously, the image data of the optical disk 1 on which the visible image is formed as well as the link information associating the image data with the identification number of the optical disk 1 are stored to the host apparatus 40.

Here, the various ones of data used in the invention are defined as in the following.

$A_n$: image area information of the image (assumed as information A, existing on the optical disk 1), $B^x_0$: identification number unique to each optical disk (assumed as information B, existing on the optical disk 1), $C^x_n$: image data of the optical disk on which the visible image is formed (assumed as information C, existing in the host apparatus 40), $D^x_n$: link information associating the information B with the information C (assumed as information D, existing in the host apparatus 40), G: image data in the image data $C^x_n$, A': image area information of the image obtained from the image data $C^x_n$ stored in the host apparatus 40, C': image data added by the user, An-exist: flag representative of the presence or absence of information A (image area information) on the optical disk 1 ("0": absent, "1": present), B0-exist: flag representative of the presence or absence of information B (identification number) on the optical disk 1 ("0": absent, "1": present).

Here, n denotes the number of addition cycles in which n=0 represents the state the first time of image formation is over, n=1 the state the first time of additional image formation is over and n=k the state the n-th time of additional image formation is over.

FIG. 13 shows an example of information B (identification number), information C (image data of the optical disk on which a visible image is formed) and information D (link information), stored or recorded to the host apparatuses or the optical disks.

(1) of FIG. 13 shows the identification number, the image data of the optical disk on which a visible image is formed and the link information at the time when the visible image is formed on the first optical disk (assumed as x=1) for the first time. In the illustrated example, the first optical disk has an identification number $B^1_0$ of "AABBCCDD", the image data $C^1_0$ of the optical disk has a file having a name "picture0.bmp", and the link information associating is given as $D^1_0(B^1_0, C^1_0)$.

(2) of FIG. 13 shows the data at the time when the first time of additional image formation is formed on the first optical disk by using a host apparatus α. Because the identification number of the optical disk is recorded only at the first time of image formation to the optical disk, $B^1_0$ does not change. Meanwhile, the image data $C^1_1$ after performing a first additional image formation is stored in a file name "picture1.bmp". The link information is given as $D^1_1(B^1_0, C^1_1)$.

(3) of FIG. 13 shows the data at the time after performing the second time of additional image formation on the first optical disk by using the same host apparatus α. The image data, at the time after performing the second time of additional image formation, is given as "picture2.bmp" while the link information is as $D^1_2(B^1_0, C^1_2)$.

(4) of FIG. 13 shows an example of the data at the time a visible image is formed on the second optical disk (assumed as x=2) for the first time by using the same host apparatus α. In the illustrated example, the identification number of the second disk has an identification number $B^2_0$ of as "ACEGIKMO". Meanwhile, the same visible image is formed as that in the first time of additional image formation to the optical disk. The image data is "picture1.bmp" that is the same as that of $C^1_1$ while the link information is $D^2_0(B^2_0, C^1_1)$. In this manner, the image data can be shared between a plurality of disks.

(5) of FIG. 13 shows an example of the data in the case a visible image is added to the first optical disk ($B^1_0$="AABBCCDD") by using a second host apparatus β. The image data $C^1_1$, at the time after the first time of additional image formation is performed by the host apparatus β, is "movie1.bmp" while the link information is $D^1_1(B^1_0, C^1_1)$. Because the additional image formation is for the first time to this host apparatus, "n" in the information C and the information D is set 1.

(6) of FIG. 13 shows an example of the data in the case the second time, for the second host apparatus β, of additional image formation is performed to the first optical disk by using the second host apparatus β. The image data $C^1_2$, at the time after performing the image formation in this time, is "movie1.bmp" while the link information is $D^1_2(B^1_0, C^1_2)$.

(7) of FIG. 13 shows an example of the data in the case the third time, for the host apparatus α, of additional image formation is made to the first optical disk by using the first host apparatus α. Between the second time of additional image formation ((3) in the above) and the additional image formation in this time by the host α, additional image formations, i.e. the above (5) and (6), have been made by the second host apparatus β. After the additional image formation in this time, the image data $C^1_3$ is "picture3.bmp" while the link information is $D^1_3(B^1_0, C^1_3)$.

(8) of FIG. 13 shows an example of the data in the case where a visible image is formed for the first time on the third disk (assumed as x=3) by using a third host γ. The identification number $B^3_0$ of the optical disk is "01234567". The image data $C^3_0$ is "data0.bmp" while the link information is $D^3_0(B^3_0, C^3_0)$.

FIGS. 14A to 14D show examples of the image data (information C), the image data G and the image area information A.

Figure 14A:
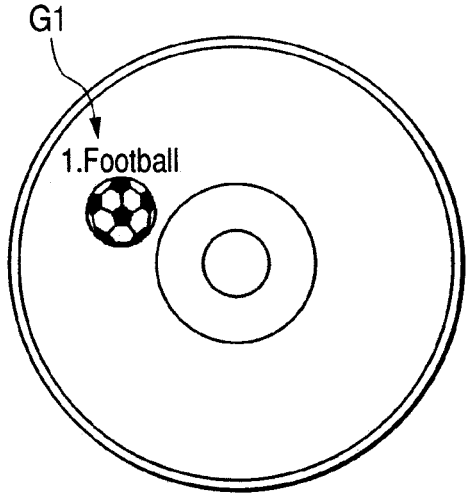
FIGS. 14A to 14D are drawings showing an example of image data (information C), image data G and image area information A.

FIG. 14A shows an example of the image data $C^x_0$ at the time a visible image is formed on the optical disk for the first time. This corresponds to (1) in FIG. 13. As shown in the figure, an image G1 is formed.

Figure 14B:
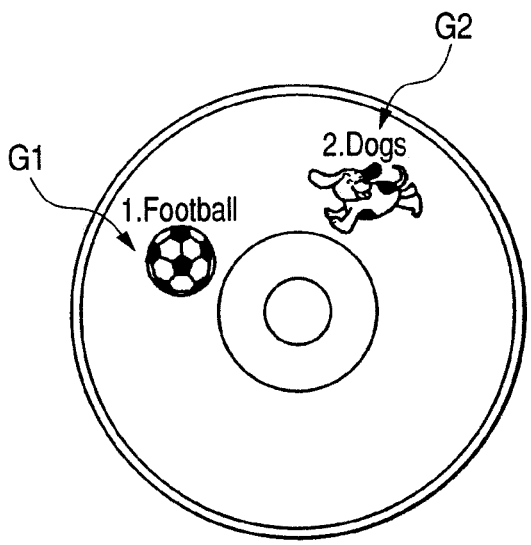

FIG. 14B shows an example of the image data $C^x_1$ at the time the first time of additional image formation is performed to the optical disk. This corresponds to (2) in FIG. 13. In addition to the image G1, a new image G2 is added. As referred later, the user is allowed to arrange the desired image G2 in a desired position by use of the edit screen displaying the image data $C^x_0$ as in FIG. 14A.

Figure 14C:
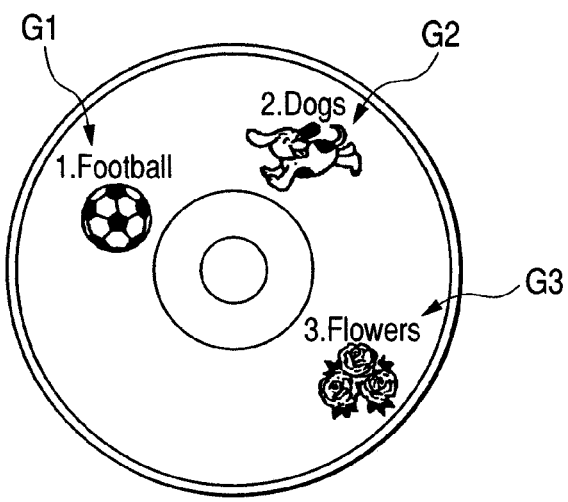

FIG. 14C shows an example of the image data $C^x_2$ at the time the second time of additional image formation is performed to the optical disk. An image G3 is added by this time of image formation The user edits the visual image G3 by use of the edit screen displaying the image data $C^x_1$ as in FIG. 14B.

Figure 14D:
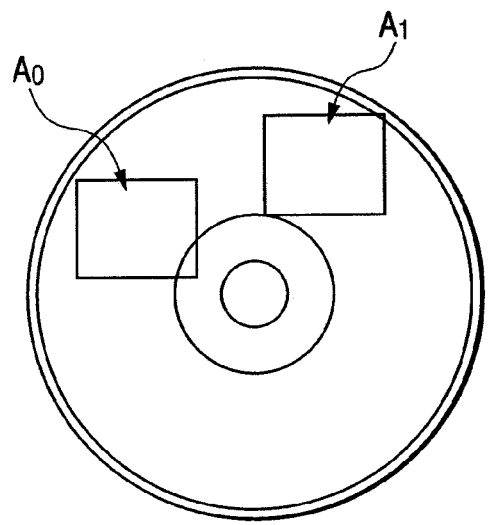

FIG. 14D shows the form of a visible image reproduced from the image area information $A_0$, $A_1$ recorded on the optical disk. When the image G1 in FIG. 14A is formed, the image area information $A_0$ capable of representing the position, shape and size thereof is recorded to the optical disk while, when the image G2 in FIG. 14B is formed, the image area information $A_1$ capable of representing the position, shape and size thereof is recorded to the optical disk 1. As referred later, when the image data $C^x_1$ on the disk is not recorded at the time an additional image formation is to be performed, the shape of the visible image is reproduced on the screen using the image area information recorded on the disk and the additional visible image is edited by use of the screen displaying the shape.

Figure 15:
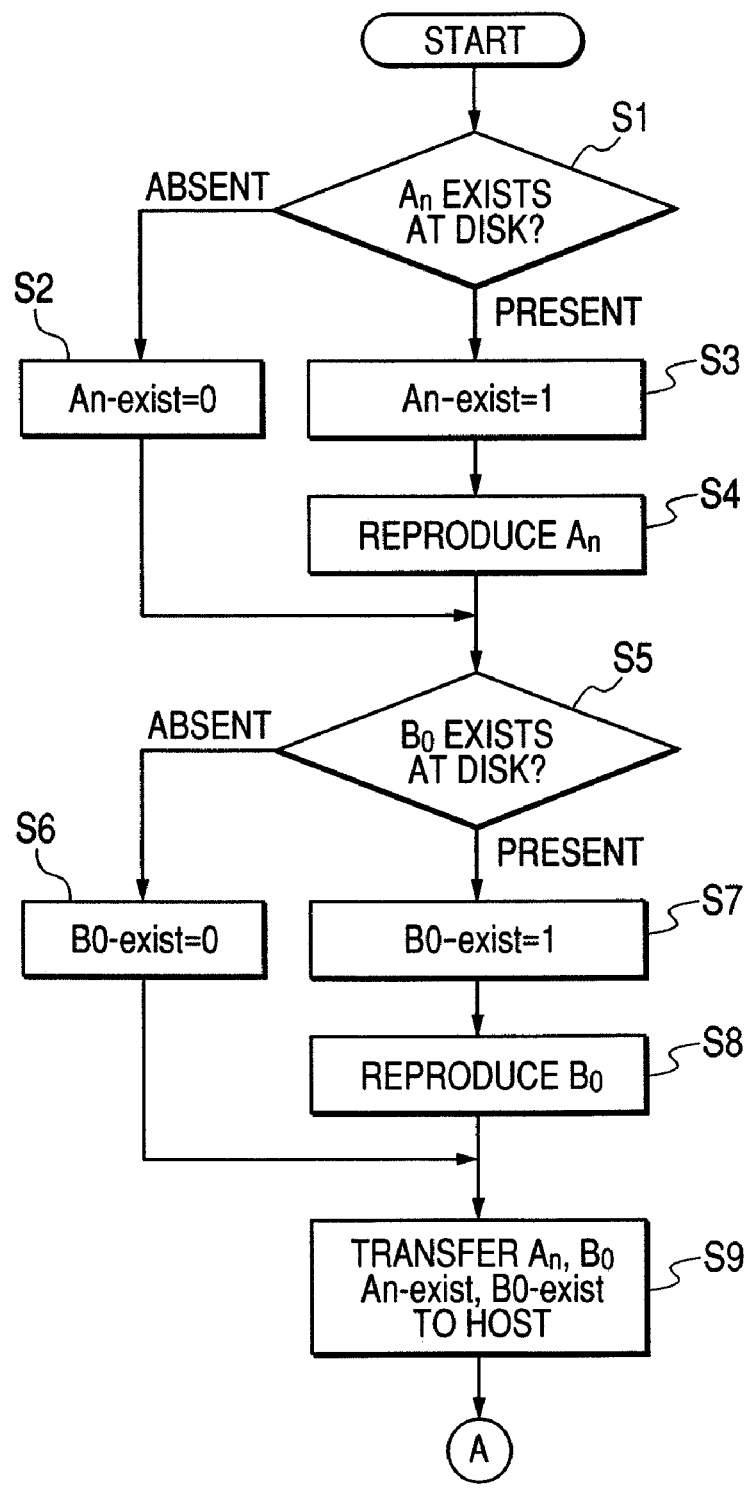
FIG. 15 is a flowchart showing a process flow on the optical-disk recording apparatus according to a fourth embodiment in the case of using the first kind of optical disk (1/3).
Figure 16:
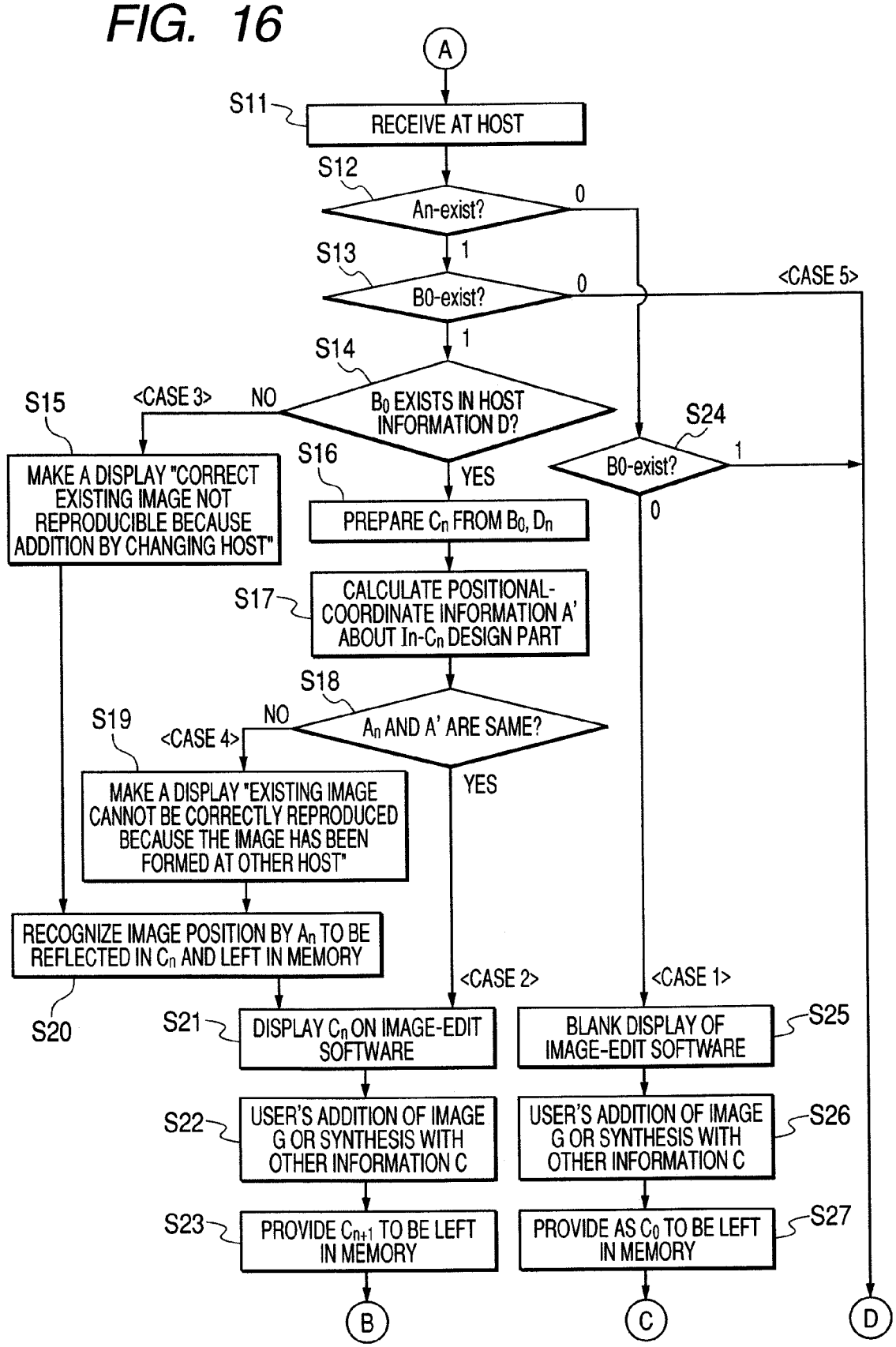
FIG. 16 is a flowchart showing a process flow on the optical-disk recording apparatus according to the fourth embodiment in the case of using the first kind of optical disk (2/3).
Figure 17:
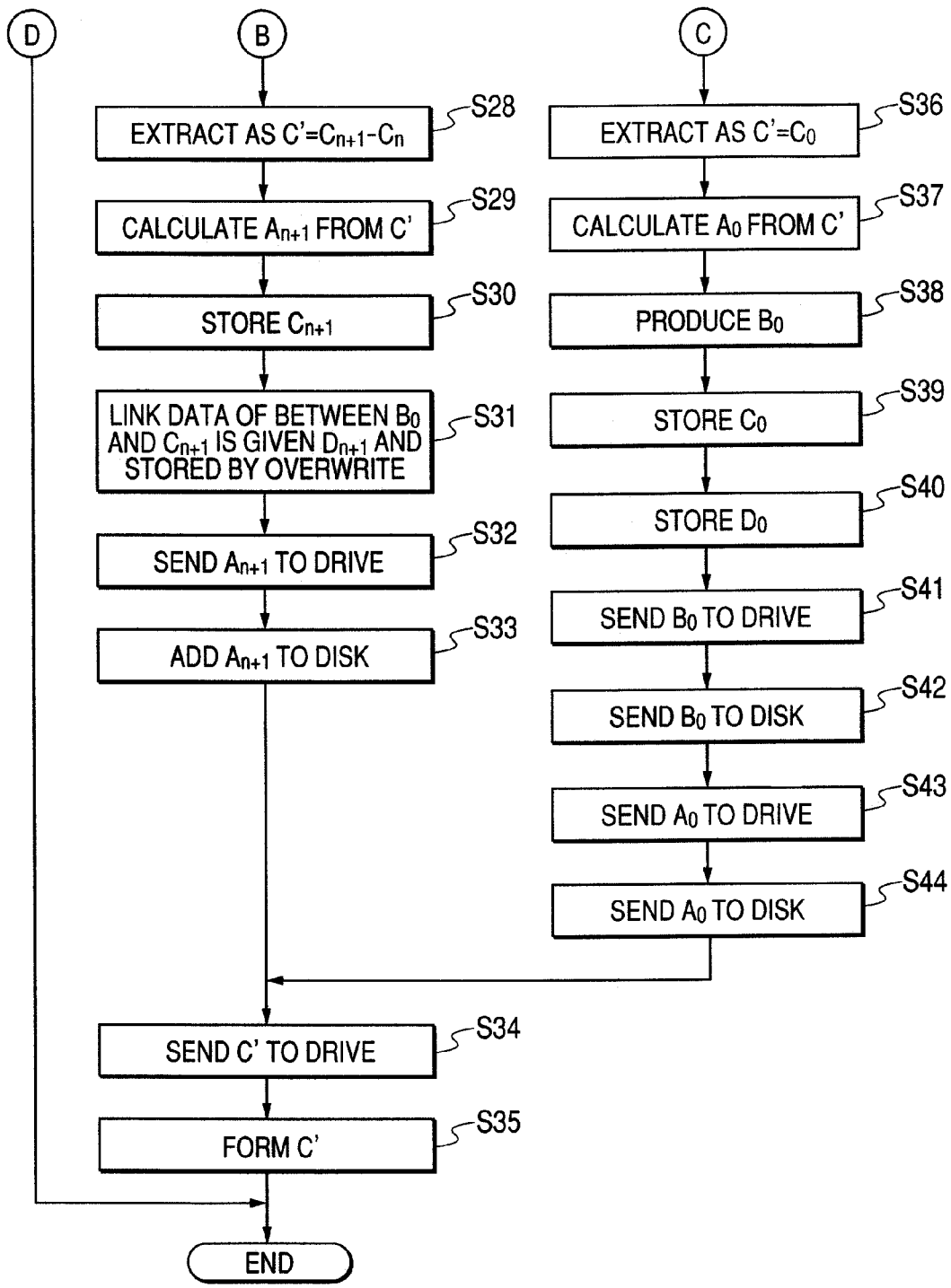
FIG. 17 is a flowchart showing a process flow on the optical-disk recording apparatus according to the fourth embodiment in the case of using the first kind of optical disk (3/3).

FIGS. 15, 16 and 17 are flowcharts showing a process flow in the optical-disk recording apparatus according to the fourth embodiment in the case of using the first kind of optical disk. Note that, in the figures, the information $B^x_0$, $C^x_n$, $D^x_n$ is omitted of its superscript x description in order to avoid complexity When the optical disk 1 is inserted in the optical-disk drive 20, the optical-disk drive 20 determines whether or not the inserted disk is the first kind of optical disk capable of forming a visible image. In the case it is not a media compatible with visible-image formation, the process ends as error. When it is the first kind of optical disk capable of forming a visible image, the process shown in FIGS. 15 to 17 is executed.

At first, the optical disk 1 is read at its inner information area 2 or outer information area 3, to determine whether or not there is a record of image area information (information $A_n$) (step S1).

When there is no record of information $A_n$, the flag An-exist is set "0" (step S2) When information $A_n$ is recorded, the flag An-exist is set "1" (step S3) and the information $A_n$ is reproduced (step S4). At this time, the optical-disk drive 20, when reading out the image area information, is to recognize and reproduce all the pieces of recorded image area information $A_0$-$A_n$ totally as image area information $A_n$.

Then, the inner information area 2 or outer information area 3 of the optical disk 1 is read, to determine whether or not the identification information (information B) is recorded (step S5).

When information $B^x_0$ is not recorded, the flag B0-exist is set "0" (step S6). When there is a record of information $B^x_0$, the flag B0-exist is set "1" (step S7) and then the information $B^x_0$ is reproduced (step S8).

The flags An-exist, B0-exist and the reproduced pieces of information $A_n$, $B^x_0$ are sent to the host apparatus 40 (step S9).

When receiving the flags An-exist, B0-exist and the information $A_n$, $B^x_0$, etc. from the optical-disk drive 20 (step S11), the host apparatus 40 determines whether or not the received flags An-exist and B0-exist are "0" or "1" (steps 812, S13, 524).

When the flags An-exist, B0-exist are both "0" (when "0" both at steps S12 and S24), it is determined that an unrecorded media is inserted to form a visible image for the first time (case 1), and hence the process proceeds to step S25.

When any one of the flags An-exist and B0-exist is "0" while the other is "1" (when "0" at step S12 and "1" at step S24, or when "1" at step S12 and "0" at step S13), i.e. when information $A_n$ exists but information $B^x_0$ does not exist or vice versa (case 5), it is determined that abnormality possibly occurred, and hence the process is ended as error. Incidentally, besides this case, the process is ended as error if it encounters an unexpected situation.

When the flags An-exist and B0-exist are both "1" (when "1" both at steps S12 and S13), it is determined whether or not the information $D^x_n$, corresponding to the information $B^x_0$ (identification number) received simultaneously, is stored in the own host apparatus 40 (step S14).

When the information $D^x_n$ is not stored, it is determined that an image is to be additionally formed by another host for the first time (case 3).

When the information $D^x_n$ is stored, read out is the image data $C^x_n$ of the optical disk on which a visible image is formed, based on the identification number $B^x_0$ and link information $D^x_n$ (step S16). Then, image area information A' is calculated on a design existing in the image data $C^x_n$ read out (step S17), to compare between the image area information A' calculated and the image area information An read from the disk 1 (step S18).

When A' and $A_n$ are equal as a result, it is determined that an image is additionally formed by using the same host apparatus (case 2), and the process proceeds to step S21.

When A' and $A_n$ are not equal, it is determined that an additional image formation is performed by using the host apparatus used in the past additional image formation (case 4), and the process proceeds to step S19.

The cases 1-4 will be explained in the following.

4.5.1-1 Case 1 (Case to Form a Visible Image on the Optical Disk for the First Time)

Where an unrecorded media is inserted to form a visible image for the first time, information $B^x_0$ does not exist on the disk and the corresponding information $C^x_0$ and $D^x_0$ does not exist in the host apparatus. Accordingly, the existing visible image is not displayed on the edit screen of the image-edit program for editing an additional visible image (step S25). The user edits position, size, etc. by newly putting an image G or edits the image data of the optical disk 1 by utilization of the existing information C (step S26).

The image data thus edited is stored, as the information $C^x_0$ corresponding to the optical disk, in the memory of the host apparatus 40 (step S27).

The image data $C^x_0$ stored is taken as visible-image data C to be additionally written to the optical disk 1 (step S36).

Then, image area information $A_0$, representing a position, shape and size of the design, is calculated based on the visible-image data C (step S37).

Then, the identification number $B^x_0$ is produced that is to be provided to the optical disk 1 (step S38). For example, the identification number is produced based on a random number generated using the current time as variable.

The information $C^x_0$ produced at the step S27 is stored in the storage section, such as the hard disk of the host apparatus 40 (step S39).

Then, link Information, associating the information $B^x_0$ with the information $C^x_0$, is produced and stored in the host apparatus 40 in the same manner (step S40).

The information $B^x_0$ is sent to the optical-disk drive 20 (step S41).

The optical-disk drive 20 records the information $B^x_0$ received from the host apparatus 40 to the inner information area 2 or outer information area 3 of the optical disk 1, by any of the method shown in FIG. 6A to 6C (step S42).

Then, the host apparatus 40-sends the image area information $A_0$ calculated at the step S37, to the optical-disk drive 20. The optical-disk drive 20 records the sent image area information $A_0$ to the inner information area 2 or outer information area 3 of the optical disk 1 (step S44).

The host apparatus 40 sends the data C' of a visible image to be added to the optical disk 1, to the optical-disk drive 20 (step S34). The optical-disk drive 20 forms the corresponding visible image on the optical disk 1 (step S35).

4.5.1-2 Case 2 (Case to Form a Visible Image by Using the Same Host Apparatus)

In this case, the information $A_n$ and $B^x_0$ on the optical disk 1 can be reproduced and link information $D^x_n$ exists in the host apparatus. Because of the agreement between the image area information A' calculated from the image data $C^x_n$ read out according to the link information $D^x_n$ and the image area information $A_n$ read from the optical disk 1, no additional image formation has been done by another host apparatus.

Accordingly, the information $C^x_n$, corresponding to the identification number $B^x_0$ of the optical disk, is read from the storage section. The information $C^x_n$ (image data of the optical disk on which a visible image is already formed) is displayed on the edit screen based on the image-edit program for editing a visible image to be formed on the optical disk 1 (step S21). This makes it possible to reproduce the existing image formed on the optical disk 1.

Referring the screen, the user edits the additional visible image by newly putting an additional image G onto the image data $C^x_n$ or combining with another piece of information C stored in the host apparatus 40 (step S22).

The edited image data $C^x_{n+1}$ is temporarily stored to the memory of the host apparatus 40 (step S23).

Then, a difference $C'=C^x_{n+1}-C^x_n$ (between the information $C^x_{n+1}$ produced and the information $C^x_n$ stored) is extracted as image data of a visible image to be added to the optical disk 1 (step S28). Namely, by taking a difference on between each pixel of the image data $C^x_{n+1}$ where a new visible image is added and each pixel of the existing image data $C^x_n$, the image data C' is extracted for a visible image the user desires to add.

Image area information $A_{n+1}$ of an additional visible image is calculated based on The image data C' thus extracted in the manner as shown in FIGS. 2 to 5 (step S29).

Then, the image data $C''_{n+1}$ produced at the step S23 is stored in the host apparatus 40 (step S30). At this time, the image data $C^x_n$ is possibly used for another optical disk and hence stored as it is.

Then, the link information $D^x_{n+1}(B^x_0, C^x_{n+1})$, associating the identification number $B^x_0$ with the image data $C^x_{n+1}$, is produced and written over the link information $D^x_n$ (step S31). Accordingly, the link information $D^x_n$ one generation before is erased to store only the newest link information $D^x_{n+1}$.

Then, the image area information $A_{n+1}$ calculated at the step S29 is sent to the optical-disk drive 20 (step S32).

The optical-disk drive 20 records the received image area information $A_{n+1}$ to the inner information area 2 or outer information area 3 of the optical disk 1, by any of the method shown in FIG. 6A to 6C (step S33). Accordingly, the image area information $A_{n+1}$ of the image added by this time of additional image formation is added to a predetermined area of the optical disk 1.

Then, the host apparatus 40 sends the additional image data C' extracted at the step S28, to the optical-disk drive 20 (step S34). The optical-disk drive 20 additionally forms the visible image on the optical disk 1 based on the image data (step S35).

4.5.1-3 Case 3 (the First Time a Visible Image Additionally is Formed by Another Host Apparatus)

In this case, although the information $A_n$, $B^x_0$ on the optical disk 1 can be reproduced, no information $D^x_n$ corresponding to the information $B^x_0$ is stored in the host apparatus 40 (No at the step S14). Thus, it is impossible to load the image data of the corresponding information $C^x_n$, and hence not to reproduce a correct existing image on the screen. For this reason, the message of the fact is first displayed on the display screen of the host apparatus 40 (step S15).

Then, the position, shape and size of the existing image is grasped from the image area information $A_n$ read from the optical disk 1. This is produced as new image data $C^x_n$ and stored in the memory (step S20).

Then, the process proceeds to step S21 where the produced image data $C^x_n$ is displayed on the edit screen based on the image-edit program for editing a visible image.

The user is allowed to put a new, additional image G onto the image data $C^x_n$ or combine it with another piece of information C stored in the host apparatus 40, thus the additional visible image can be inserted and edited so as to prevent against overlapping with the existing visible image.

The process subsequent is similar to that of case 2.

4.5-4 Case 4 (Case to Make an Additional Image Formation Again by Using the Host Apparatus Used in the Past Additional Image Formation)

In this case, the information $A_n$, $B^x_0$ on the optical disk 1 can be reproduced. Although link information $D^x_n$ exists in the host apparatus 40, there is no agreement between the image area information A' calculated from the image data $C^x_n$ read out based on the link information $D^x_n$ and the image area information An read from the optical disk 1. Accordingly, this is the case that it can be known that a visible image has been added by another host apparatus (β) after forming a visible image by the host apparatus (α) last time.

In this case, the image data $C^x_n$ stored in this host apparatus 40 does not contain the information of a visible image added by the other host apparatus, thus making it impossible to reproduce a correct existing image on the screen, Thus, the message of the fact is displayed on the screen (step S19).

Then, the position, shape and size of the existing image is grasped based on the image area information $A_n$ read from the optical disk 1. This is reflected in the image data $C^x_n$ and stored as new image data $C^x_n$ in the memory (step S20).

In the same manner as the cases 2, 3, the image data $C^x_n$ is displayed on the edit screen based on the image-edit program (step S21). The user is to make an editing of an additional visible image by use of the screen (step S22).

The process subsequent is similar to those of cases 2, 3.

Figure 25:
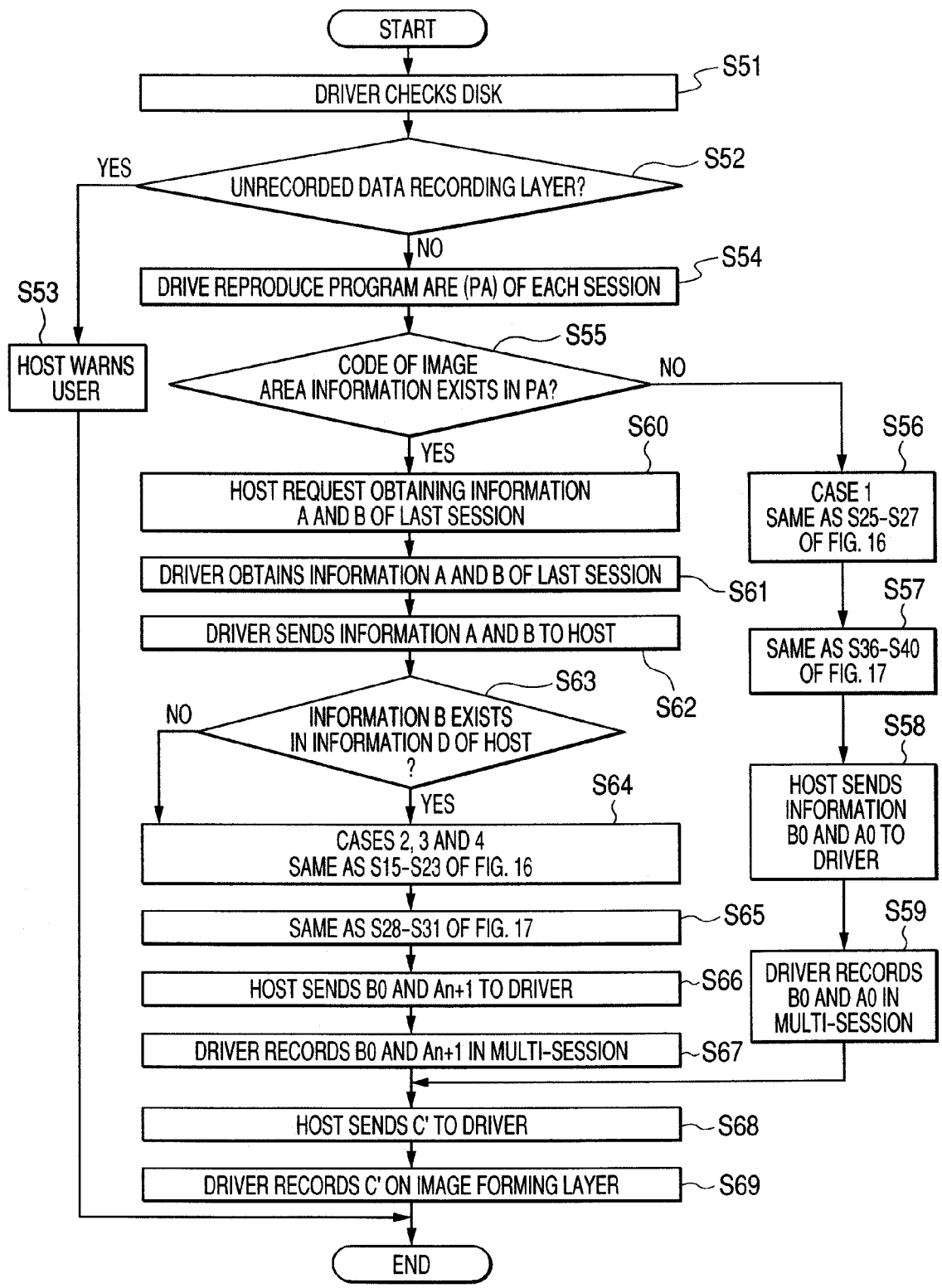
FIG. 25 is a flowchart showing a process flow on the optical-disk recording apparatus according to the fourth embodiment in the case of using the second kind of optical disk.

4.5.2 Operation of Optical Disk Recording Medium According to Fourth Embodiment in Case of Using Second Kind of Optical Disk FIG. 25 is a flowchart showing a process flow on the optical-disk recording apparatus according to the fourth embodiment in the case of using the second kind of optical disk.

When the optical disk is set to the optical-disk drive apparatus 20, the optical-disk drive apparatus 20 determines whether the set optical disk is a multi session disk of the second kind of optical disk or not (step S51). When the set optical disk is the second kind of optical disk and the host apparatus 40 issues a command for instructing an image formation, the drive apparatus 20 determines whether the data recording layer of the optical disk is unrecorded or not (step S52).

When the data recording layer is unrecorded, this fact is informed to the host apparatus 40 and the host apparatus 40 displays a warning to urge the user to execute the image formation after recording data in the data recording layer and ends the process (step S53). This is for preventing any inconvenience which occurs when the image area information of the image is recorded in the first session because some of reproducing only apparatus operates on the assumption that the first session always contains data of music, image and the like.

On the other hand, when data is recorded in the data recording layer, the drive apparatus 20 reproduces the program area of each recorded session (steps S54), and determines whether the session recording the image area information exits or not by determining whether a recognition code of the image area information is detected or not.

If the session recording the image area information does not exit, an image is not formed on the disk and thus this falls into the case 1 (first time to recording an image on the optical disk). Therefore, process of steps S25-S27 of FIG. 16 is performed (step S56). That is, a surface of the optical disk in blank layout is displayed on the edit screen of the image editing program, and image data $C^x_0$ as the result of editing process such as adding image by the user is obtained and stored in the memory of the host apparatus 40.

Sequentially, process of steps S36 to S40 of FIG. 17 is executed (step S57). That is, as data C' of the image to be added to the optical disk, image area information $A_0$ representative of position, shape and size of the area of the image is calculated based on the image data C'. The identification number $B^x_0$ (information B) unique to the optical disk, and link information $D^x_0$ associating the identification number $B^x_0$ with the image data $C^x_0$ are created. Then, image data $C^x_0$ and link information $D^x_0$ are stored.

The image area information $A_0$ and the identification number $B^x_0$ are sent to the optical-disk drive apparatus 20 (step S58), and the optical-disk drive apparatus 20 records the received image area information $A_0$ and identification number $B^x_0$ in the second kind of optical disk set in multi session (step S59).

Then, the host apparatus 40 sends, to the optical-disk drive apparatus 20, the data C' of the image to be added (step S68), and the optical-disk drive apparatus 20 records the data C' of the image in the image forming layer of the second kind of optical disk (step S69).

On the other hand, if the session in which the image area information is recorded in the program area of the optical disk exists (YES in step S55), the host apparatus 40 request to obtain from the optical-disk drive apparatus 20 the image area information (information A) and the identification code (information B) unique to the disk which are recorded in the last session out of sessions in which the image area information is recorded. Thereby, in the case that a plurality of sessions in which the image area information is recorded exit, the latest image area information recorded in the optical disk can be obtained.

In response to this request, the optical-disk drive apparatus 20 reads out the latest image area information (information A) and the identification number (information B) f the disk (step S61), and sends it to the host apparatus step S62).

The host apparatus 40 determines whether or not the identification number $B^x_0$ (information B) of the disk sent from the optical-disk drive apparatus 20 exists in the link information (information D) stored in the apparatus, that is, determines whether or not the link information $D^x_0$ corresponding to the identification number $B^x_0$ is stored in the host apparatus 40 (step S63).

Depending on the result, in the same manner as the case of FIG. 16, process of the case 2 (add image using same host apparatus), the case 3 (first time a visible image is additionally formed by another host apparatus) and the case 4 (case to make an additional image formation again by using the host apparatus used in the past additional image formation) is executed (step S64).

That is, when the identification number $B^x_0$ does not exit in the link information D stored in the host apparatus 40 (NO in step S63), since this falls into the case (case 3) that first time the image is to be additionally formed by another host apparatus, after displaying a warning to the effect that the current image cannot be represented correctly, a position, shape and size of the current image is grasped based on the recorded image area information $A_n$, new image data $C^x_n$ is created based thereon and stored in the memory and the image data $C^x_n$ is displayed on the edit screen of the image editing program.

When the identification number $B^x_0$ exists in the link information D stored in the host apparatus 40 (YES in step S63), the image data $C^x_n$ of the optical disk is read out based on the identification number $B^x_0$ and the link information $D^x_n$. Then, the image area information A' of the design portion in the read image data $C^x_n$ is calculated, and the calculated image area information A' and the image area information $A_n$ read out from the optical disk are compared.

When the calculated image area information A' is not in agreement with the image area information $A_n$ read out from the optical disk, since this falls into the case (case 4) that the image formation has been done by another host apparatus, a warning is displayed to the effect that the current image cannot be reproduced correctly. Then in the same manner as the case 3, a position, shape and size of the current image is grasped based on the recorded image area information $A_n$, new image data $C^x_n$ is created based thereon and stored in the memory and the image data $C^x_n$ is displayed on the edit screen of the image editing program.

On the other hand, when the calculated image area information A' is in agreement with the image area information $A_n$, this falls in the case (case 2) that the image is additionally formed by using same host apparatus, and thus image data $C^x_n$ which is read out based on the link information $D^x_n$ is displayed on the edit screen of the image editing program.

In view of above, the image data $C^x_n$ corresponding to each of case 2, case 3 and case 4, is displayed on the edit screen, and the user pastes a desired image G on the edit screen, or edit the added image by combining it with other information C stored in the host apparatus 40. Then, the image data $C^x_{n+1}$ created as the result of edit is temporally stored in the memory of the host apparatus 40.

Next, the process almost identical to the steps S28 to S31 of FIG. 17 is executed (step S65). That is, differential (C'= $C^x_{n+1} - C^x_n$) between the created image data $C^x_{n+1}$ and the image data $C^x_n$ is extracted as the image data to be added to the optical disk. The image area information $A^x_{n+1}$ representative of position, shape and size of an area occupying the image data included therein is calculated based on the created image data $C^x_{n+1}$. In contrast to the step S29 in which the image area information $A^x_{n+1}$ is calculated based on the differential information C', here, the image area information $A^x_{n+1}$ is created based on the created image data $C^x_{n+1}$. Then, the host apparatus 40 stores the created image data $C^x_{n+1}$ and overwrites the created link information $D^x_{n+1}$ on the link information $D^x_n$.

The host apparatus 40 sends the data C' to the optical-disk drive apparatus 20 and the optical-disk drive apparatus 20 records the received data C' in the image forming layer of the second kind of optical disk.

Therefore, the image can be easily formed on a correct position of the second kind of optical disk.

In the above description, in the case of using the second kind of optical disk, the image area information for the image which is recorded on the disk surface after the image is added is recorded every time the image is added. However, this is not limited thereto. In the same manner as in the case of using the first kind of optical disk, the image area information corresponding to the added image may be recorded in a new section, and data of all sessions in which the positional information may be read out and combined to display it on the display.

4.6. Modifications

Incidentally, in the above, the write sequence of the pieces of information A, B and c may be changed. The above is not limited but may be changed as in the following.

4.6-1 Modification 1

In the embodiment described above, the identification number $B^x_0$ unique to the optical disk is recorded to the optical disk only when a visible image is formed for the first time. Alternatively, an identification number may be produced and recorded to the optical disk 1 each time additional image formation is done In this case, when a visible image is formed, the identification number of the optical disk is stored in the host apparatus so that the recorded identification number can be read from the optical disk 1. When there is an agreement with the identification number stored in the host apparatus, it can be determined as an additional image formation made by the same host apparatus. When there is no agreement therewith, it can be determined as an additional image formation made by another host.

This eliminates the necessity of the comparison step (the steps S17, S18) of between the image based on the on-disk-surface information A and the image based on the image data C stored in the host apparatus.

4.6-2 Modification 2

In the foregoing cases, when (An-exist, B0-exist)=(1, 0) or (0, 1) is held, the process is ended as error (case 5). Alternatively, a remedy step may be taken without an end as error. In such a case, any advisory display should be displayed first. For example, a display "additional image formation is not available correctly because a part piece of information is not to be read from the disk" may be displayed.

In the case of (An-exist, B0-exist)=(1, 0), the process may be proceeded in the same manner as case 3. Then, repair may be made by reproducing and recording information B after additionally form an image.

In the case of (An-exist, B0-exist)=(0, 1), examination is made as to whether or not information B in the link information D is stored in the host apparatus. When it exists, the existing image is reproduced based on information C. Then, additional image formation may be made in a manner similar to case 2 and, the information A may be recorded to the disk. When it does not exist, any piece of information of the existing image cannot be read out and hence image reproduction cannot be performed on the host. Accordingly, blank display is made on the host. From then on, the process may be proceeded in the same manner as case 1 (unrecorded disk). However, a recording of information B to the disk is omitted.

4.6-3 Modification 3

In the foregoing case 4, instead of displaying only information $A_n$ when displaying the existing image, an image may be first displayed based on the information $C^x_n$ stored in the host apparatus so that the existing image can be displayed by supplementing an insufficient portion from the information $A_n$.

What is claimed is:

1. A method of forming a visible image on an optical disk, the method comprising:
    recording, in a predetermined area of the optical disk, an identification number unique to the optical disk;
    storing first image data of the optical disk, on which a first visible image is formed, and link information, which associates the first image data with the identification number of the optical disk, into a host computer when the first visible image is formed on the optical disk;
    first reading the identification number from the optical disk;
    second reading a newest one of the first image data from the host computer based on the read-out identification number and the link information;
    displaying the read-out first image data on an edit screen;
    editing the first image data and image data corresponding to a visible image to be newly added and formed on the optical disk on the edit screen; and
    forming, on the optical disk, the visible image to be newly added and formed on the optical disk.

2. The method according to claim 1, further comprising storing the identification number to the host computer when the identification number is recorded in a predetermined area of the optical disk in the recording step,
    wherein the second reading step includes a step of making an alert display when the host apparatus does not store an identification number which corresponds to the identification number of the optical disk or when the host apparatus does not store the link information associated with the identification number of the optical disk.

3. The method according to claim 1, wherein
    the optical disk includes a visible-image recording area for forming a visible image thereon and a recording area having a plurality of tracks helically formed by grooving, in advance, at least one of innermost and outermost portions of the disk,
    the groove is not formed in the visible-image recording area, and
    the identification number is recorded in the recording area.

4. The method according to claim 3, wherein the identification number recording step is to encode the identification number by a predetermined coding method and form a mark and a space alternately in the track of the recording area based on the encoded identification number.

5. The method according to claim 3, wherein the identification number recording step is to assign bits of the identification respectively to sectors into which the track of the recording area is divided by a predetermined length and form the sectors in a state to be optically distinguished according to a bit value of the bits.

6. The method according to claim 3, wherein the identification number recording step is to form a barcode corresponding to the identification number radially in the recording area.

7. The method according to claim 1, wherein the identification number is recorded when a visible image is formed on the optical disk for the first time.

8. The method according to claim 1, wherein the identification number is a disk identification number stored in a program memory area of the optical disk.

9. The method according to claim 1 further comprising creating new link information which associates, with the identification number of the optical disk, new image data created based on the first image data and the image data corresponding to the visible image to be newly added and formed on the optical disk.

10. The method according to claim 9, wherein, in the storing step, after storing the new link information to the host computer, the link information corresponding to the identification number of the optical disk, stored earlier in the host apparatus, is erased.

11. An apparatus for forming a visible image on an optical disk, the apparatus comprising:
    a recoding unit that records, in a predetermined area of the optical disk, an identification number unique to the optical disk;

a storing unit that stores first image data of the optical disk on which a visible first image is formed, and link information, which associates the first image data with the identification number of the optical disk, into a host computer when the first visible image is formed on the optical disk by a laser beam;

a first reading unit that reads the identification number from the optical disk;

a second reading unit that reads a newest one of the first image data from the host computer based on the read-out identification number and the link information;

a display unit that displays the read-out first image data on an edit screen;

an editing unit that edits the first image data and image data corresponding to a visible image to be newly added and formed on the optical disk on the edit screen; and an image forming unit that forms, on the optical disk, the visible image to be newly added and formed on the optical disk.

12. The apparatus according to claim 11, wherein the storing unit stores the identification number to the host computer when the identification number is recorded in a predetermined area of the optical disk by the recording unit, and wherein the second reading unit makes an alert display when the host apparatus does not store an identification number which corresponds to the identification number of the optical disk or when the host computer does not store the link information associated with the identification number of the optical disk.

13. The apparatus according to claim 11, wherein the optical disk includes a visible-image recording area for forming a visible image thereon and a recording area having a plurality of tracks helically formed by grooving, in advance, at least one of innermost and outermost portions of the disk, the groove is not formed in the visible-image recording area, and the identification number is recorded in the recording area.

14. The apparatus according to claim 13, wherein the recording unit encodes the identification number by a predetermined coding method and forms a mark and a space alternately in the track of the recording area based on the encoded identification number.

15. The apparatus according to claim 13, wherein the recording unit assigns bits of the identification respectively to sectors into which the track of the recording area is divided by a predetermined length and form the sectors in a state to be optically distinguished according to a bit value of the bits.

16. The apparatus according to claim 13, wherein the recording unit forms a barcode corresponding to the identification number radially in the recording area.

17. The apparatus according to claim 11, wherein the identification number is recorded when a visible image is formed on the optical disk for the first time.

18. The apparatus according to claim 11, wherein an optical pickup for applying the laser beam to the optical disk constitutes a part of the recording unit and a part of the image forming unit.

19. The apparatus according to claim 11, wherein the identification number is a disk identification number stored in a program memory area of the optical disk.

20. The apparatus according to claim 11, wherein new link information which associates, with the identification number of the optical disk, new image data created based on the first image data and the image data corresponding to the visible image to be newly added and formed on the optical disk is created.

21. The apparatus according to claim 20, wherein, after the storing unit stores the new link information to the host computer, the link information corresponding to the identification number of the optical disk, stored earlier in the host apparatus, is erased.

* * * * *